US012340015B2

(12) United States Patent
Homma

(10) Patent No.: US 12,340,015 B2
(45) Date of Patent: Jun. 24, 2025

(54) INFORMATION PROCESSING SYSTEM, INFORMATION PROCESSING METHOD, AND PROGRAM

(71) Applicant: SONY GROUP CORPORATION, Tokyo (JP)

(72) Inventor: Shunichi Homma, Saitama (JP)

(73) Assignee: SONY GROUP CORPORATION, Tokyo (JP)

( * ) Notice: Subject to any disclaimer, the term of this patent is extended or adjusted under 35 U.S.C. 154(b) by 166 days.

(21) Appl. No.: 17/767,746

(22) PCT Filed: Oct. 30, 2020

(86) PCT No.: PCT/JP2020/040878
§ 371 (c)(1),
(2) Date: Apr. 8, 2022

(87) PCT Pub. No.: WO2021/095573
PCT Pub. Date: May 20, 2021

(65) Prior Publication Data
US 2024/0077941 A1 Mar. 7, 2024

(30) Foreign Application Priority Data

Nov. 15, 2019 (JP) ................. 2019-207477

(51) Int. Cl.
*G06F 3/01* (2006.01)
*H04N 21/2187* (2011.01)
(52) U.S. Cl.
CPC .......... *G06F 3/013* (2013.01); *H04N 21/2187* (2013.01)
(58) Field of Classification Search
CPC ..................... G06F 3/013; H04N 21/2187
(Continued)

(56) References Cited

U.S. PATENT DOCUMENTS 11,729,342 B2 * 8/2023 Fayad ................. H04N 7/147
348/36
2010/0123770 A1 * 5/2010 Friel .................. H04N 7/15
348/240.99
(Continued)

FOREIGN PATENT DOCUMENTS

CN 101770506 A 7/2010
CN 102473264 A 5/2012
(Continued)

*Primary Examiner* — Gabriel I Garcia
(74) *Attorney, Agent, or Firm* — Paratus Law Group, PLLC

(57) ABSTRACT

There is provided an information processing system to cause a performer who appears in content distributed in real time to give a performance according to a viewer's reaction in a remote location. The information processing system includes a control unit. The control unit acquires, from a terminal of a viewer on which content obtained by shooting a performance of a performer is being reproduced via a network in real time, a gaze parameter indicating a gaze of the viewer in a coordinate system of a space in which the viewer is present, the gaze parameter being acquired together with a viewer identification information for identifying the viewer. Moreover, the control unit converts the acquired gaze parameter to a gaze parameter indicating a virtual gaze of the viewer in a coordinate system of a space in which the performer is present. Furthermore, the control unit outputs, on the basis of the converted gaze parameter, gaze information indicating the virtual gaze of the viewer to an output device in the space in which the performer is present.

14 Claims, 24 Drawing Sheets

(58) Field of Classification Search
USPC .......................................................... 382/103
See application file for complete search history.

(56) References Cited

U.S. PATENT DOCUMENTS

| | | | |
|---|---|---|---|
| 2013/0013089 A1 | 1/2013 | Kawakami | |
| 2013/0014139 A1 | 1/2013 | Kawakami | |
| 2014/0053173 A1* | 2/2014 | Oh | G06Q 30/0242 |
| | | | 725/12 |
| 2017/0150218 A1* | 5/2017 | Oobuchi | H04N 21/442 |
| 2018/0205888 A1 | 7/2018 | Tsukahara | |
| 2022/0070371 A1* | 3/2022 | Bushman | H04N 23/611 |

FOREIGN PATENT DOCUMENTS

| | | |
|---|---|---|
| CN | 104025572 A | 9/2014 |
| CN | 105323531 A | 2/2016 |
| CN | 108628933 A | 10/2018 |
| CN | 109964212 A | 7/2019 |
| CN | 110244778 A | 9/2019 |
| JP | 2009-211528 A | 9/2009 |
| JP | 2018139787 A | 9/2018 |
| JP | 2019043312 A | 3/2019 |
| JP | 6519468 B2 | 5/2019 |
| JP | 2019-126101 A | 7/2019 |
| JP | 2019-192178 A | 10/2019 |
| WO | WO-2019143766 A1 | 7/2019 |
| WO | WO-2019143780 A1 | 7/2019 |

* cited by examiner

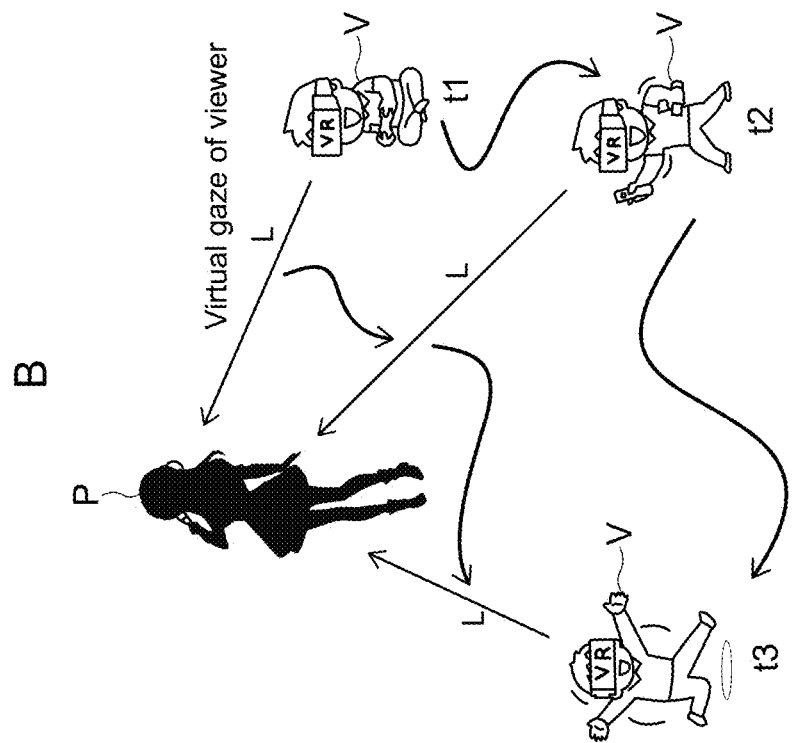
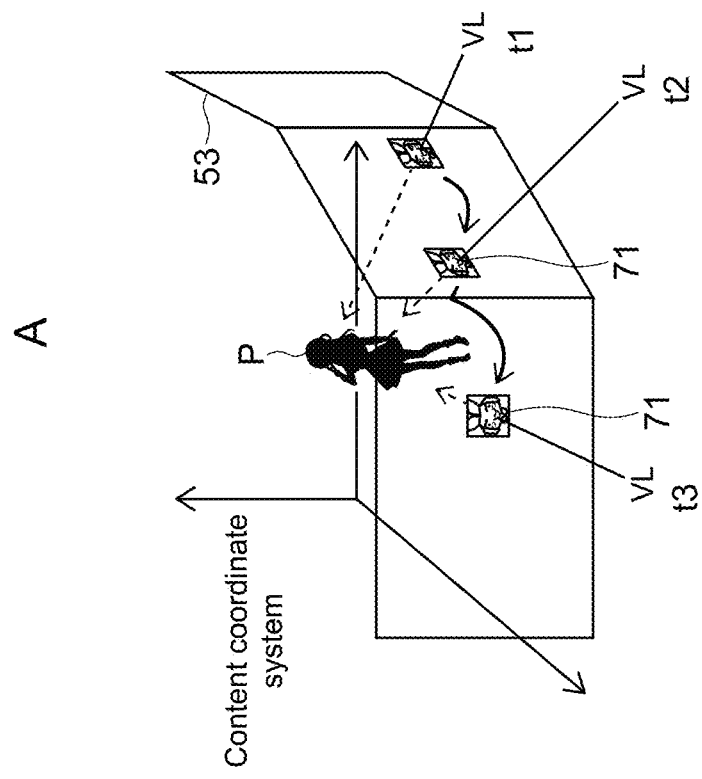
FIG.8

A  Effect table

| Effect IDs | Effects |
|---|---|
| 1000 | Display "Balloon comment: Cute" in periphery of avatar image of input viewer |
| 1001 | Reproduce "Sound effect: Cute" from speaker in vicinity of avatar image of input viewer |
| 1002 | Display "Visual effect: Star" in periphery of avatar image of input viewer |
| 1003 | Display "Visual effect: Rainbow" in periphery of avatar image of input viewer |

B1  Viewer 1 Action table

| Action IDs | Actions | Effect IDs |
|---|---|---|
| 100 | Repeated up-and-down movement of head | 1000 |
| 101 | Repeated turn movement of head | 1003 |
| 102 | Input to button A of controller | 1001 |

B2  Viewer 2 Action table

| Action IDs | Actions | Effect IDs |
|---|---|---|
| 100 | Vertical shake of controller | 1003 |
| 101 | Repeated up-and-down movement of head | 1000 |
| 102 | Repeated turn movement of head | 2000 |

B3  Viewer 3 Action table

| Action IDs | Actions | Effect IDs |
|---|---|---|
| 100 | Input to button A of controller | 1000 |
| 101 | Successive input to button A of controller | 1004 |
| 102 | Successive input to button B of controller | 3000 |

FIG.12

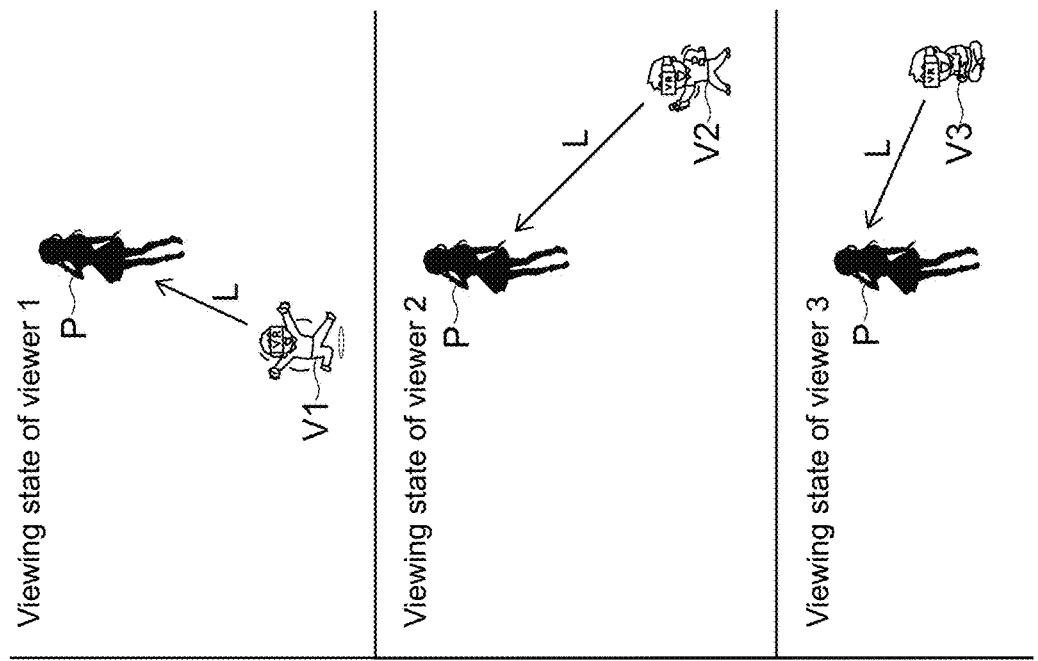
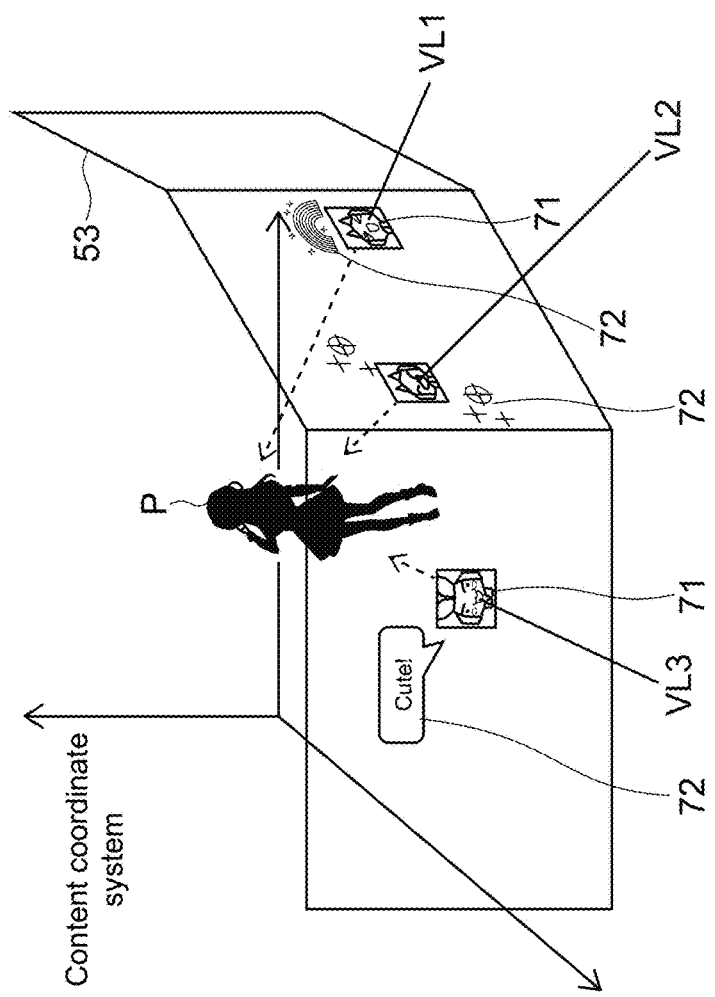
FIG.13

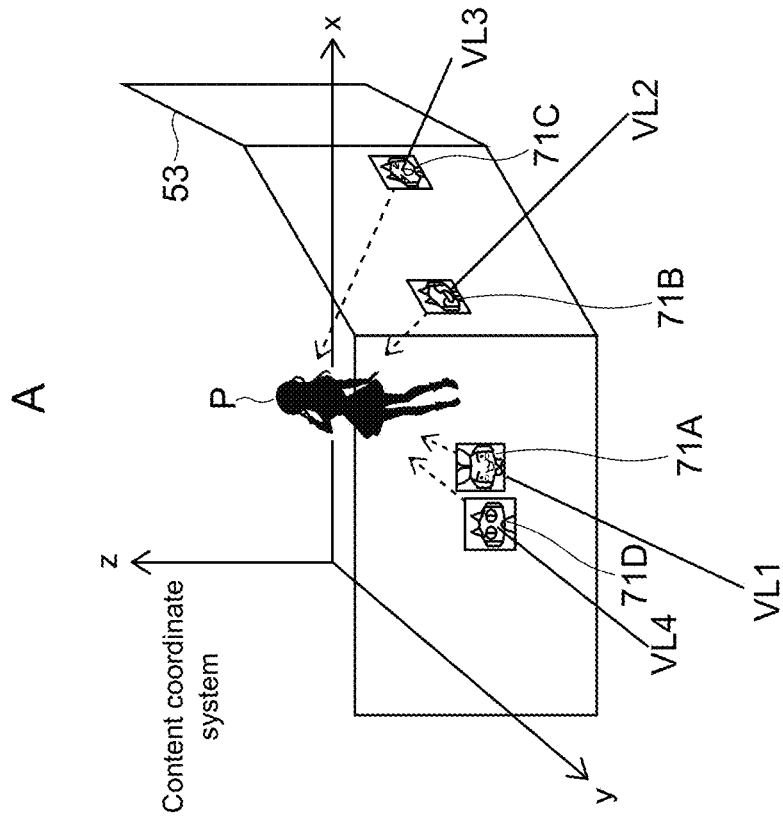
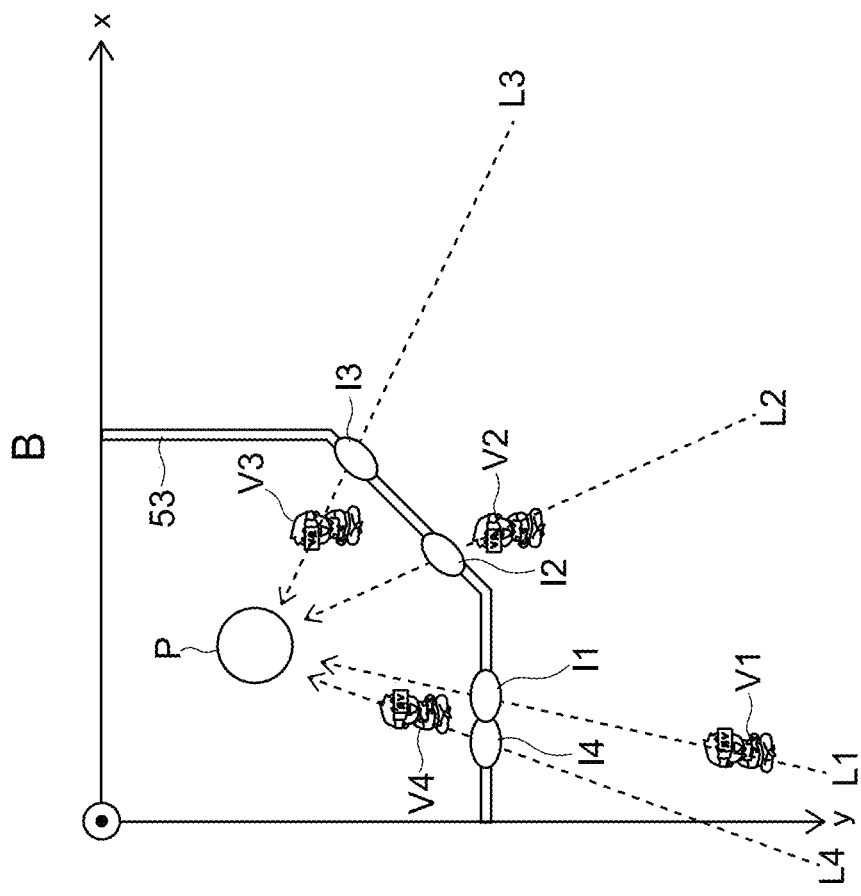
FIG.18

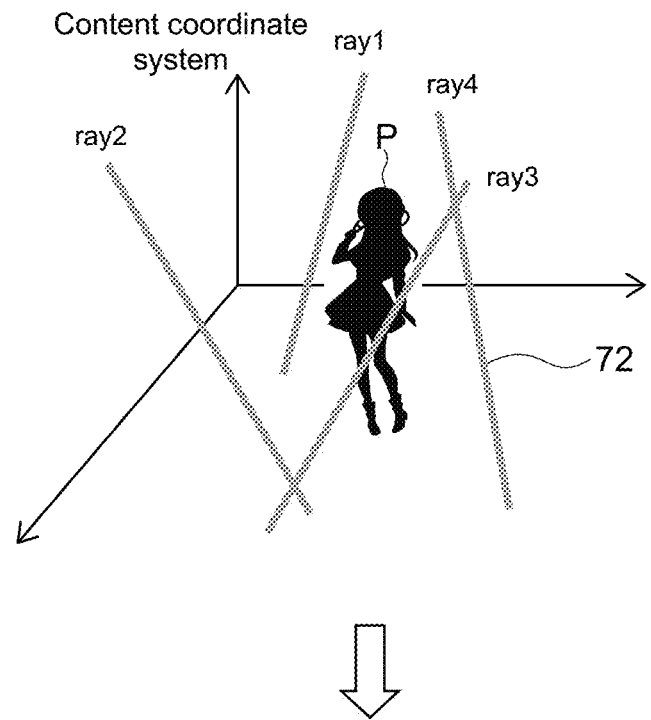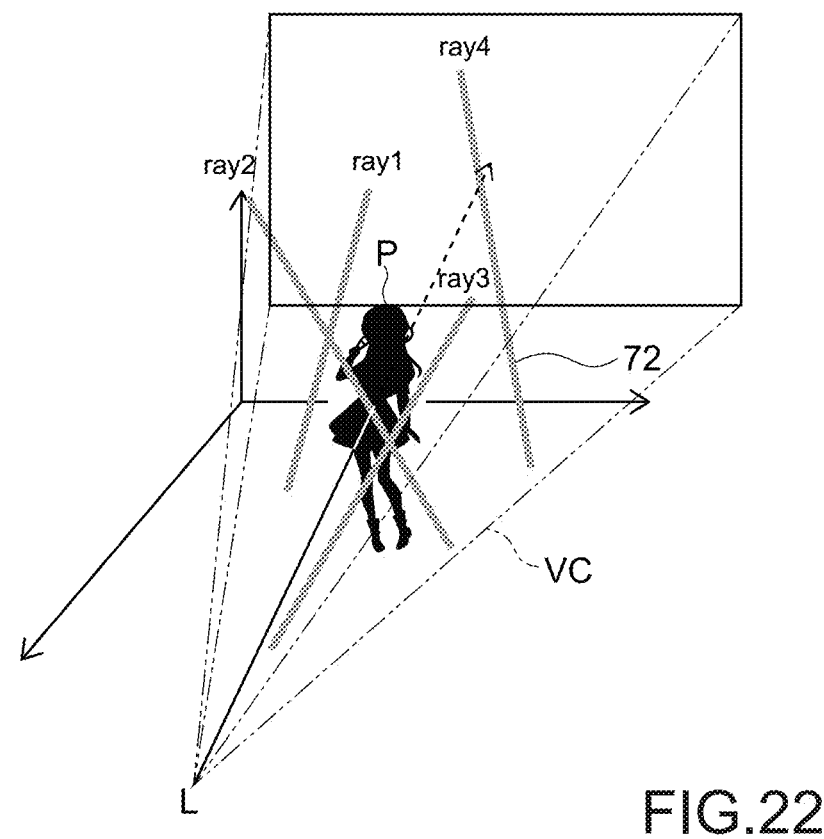
FIG.22

INFORMATION PROCESSING SYSTEM, INFORMATION PROCESSING METHOD, AND PROGRAM

CROSS REFERENCE TO PRIOR APPLICATION

This application is a National Stage Patent Application of PCT International Patent Application No. PCT/JP2020/040878 (filed on Oct. 30, 2020) under 35 U.S.C. § 371, which claims priority to Japanese Patent Application No. 2019-207477 (filed on Nov. 15, 2019), which are all hereby incorporated by reference in their entirety.

TECHNICAL FIELD

The present technology relates to an information processing system, an information processing method, and a program that are capable of presenting information related to a viewer to a performer in a system in which content obtained by shooting a performance of the performer is distributed via a network in real time.

BACKGROUND ART

With the development of the network technology, content distribution services to remote locations have continued to grow. For example, video distribution, including movie content, has been realized by a unidirectional system in which a distributor distributes content data to viewers and the viewers enjoy the distributed content.

In recent years, for example, some real-time video distribution services have realized bidirectional systems in which the distributor and the viewers can communicate with each other. Such a system provides a new value of experiencing not only content itself but also communication via the content.

A communication means from the viewers to the distributor in such a system is mainly text information and audio information. In particular, as to the text information, text information input by the viewers is superimposed on a distributed video to realize not only communication between the distributor and the viewers but also communication between the viewers.

As means of realizing communication via a network, for example, Patent Literature 1 below has disclosed means of equal text-based communication between a plurality of users in the same virtual space.

Also, Patent Literature 2 below has disclosed means for checking mutual states of users utilizing the same content.

CITATION LIST

Patent Literature

Patent Literature 1: Japanese Patent Application Laid-open No. 2009-211528
Patent Literature 2: Japanese Patent No. 6519468

DISCLOSURE OF INVENTION

Technical Problem

In the conventional technologies, text information and audio information are mainly used as the communication means between the distributor and the viewers. However, there is a great gap between the experience of such communication performed via a network and the experience of communication performed at a physically close distance (distance at which the partner can be seen).

For example, the following service is assumed. In this service, in order to enable also customers located in remote locations to experience a music live concert held in a limited place, the distributor acquires image and audio data of the performer in real time, converts such data to content data to be distributed, and distributes the content data to movie theaters or respective households via a network. In this case, the content is distributed to the movie theaters as content to be projected onto screens and also distributed to the respective households as content that can be viewed on television sets or as content that can be viewed with head-mounted displays (HMD).

In an actual venue where the music live concert is held, the performer can suitably decide a next action while checking how many people are in the audience, where the audience are located, how they are distributed physically, how they are reacting to his or her act, direction, and performance, and the like. Moreover, as the audience, since the performer decides a next action while watching their positions and reactions, they can enjoy the direction, so-called "call and response", in which the performer turns his or her gaze toward them and they can respond to a call from the performer or receive an answer from the performer, or can experience communication other than listening to music in which they can feel other audience reactions.

However, it is difficult to reproduce those communication experiences by using the conventional communication means via a network using text and audio. Therefore, even as the audience of the same music live concert, there is a large gap between the experience obtained in the actual venue and the experience obtained in remote locations via the network.

In addition, with the development of the network technology, content distribution utilizing live streaming services on an individual basis has also become more active. Such content distribution is often performed in such a form that the viewers are not present in the actual shooting site and the viewers are present only in remote locations via a network. In this environment, since the performer cannot directly look at the viewers and feel the viewers' gazes, the performer cannot know where the performer should look at and toward which direction the performer should turn his or her face in giving a performance, and the performer cannot take an appropriate action. Furthermore, there is a problem in that the performer cannot suitably decide a next action, for example, because the performer cannot see the viewers' reactions to his or her performance.

Even the respective technologies described in Patent Literature 1 and 2 above have not disclosed the communication between the performer who appears in the content and the viewers and the notification to the performer of the viewer's reaction.

In view of the above-mentioned circumstances, it is an object of the present technology to provide an information processing system, an information processing method, and a program that are capable of causing a performer who appears in content distributed in real time to give a performance according to a viewer's reaction in a remote location.

Solution to Problem

In order to accomplish the above-mentioned object, an information processing system according to an embodiment of the present technology includes a control unit. The control unit acquires, from a terminal of a viewer on which content obtained by shooting a performance of a performer is being reproduced via a network in real time, a gaze parameter indicating a gaze of the viewer in a coordinate system of a space in which the viewer is present, the gaze parameter being acquired together with a viewer identification information for identifying the viewer. Moreover, the control unit converts the acquired gaze parameter to a gaze parameter indicating a virtual gaze of the viewer in a coordinate system of a space in which the performer is present. Furthermore, the control unit outputs, on the basis of the converted gaze parameter, gaze information indicating the virtual gaze of the viewer to an output device in the space in which the performer is present.

Accordingly, the information processing system can cause the performer to notice the virtual gaze of the viewer, and can cause the performer to give even a viewer in a remote location an appropriate performance according to the viewer's reaction. The gaze information may be image information or may be audio information. Moreover, the gaze information may include virtual position information of the viewer.

The output device may be a display. In this case, the control unit may calculate, on the basis of the converted gaze parameter, intersection coordinates of the display and the virtual gaze and cause an image associated with the viewer to be output as the gaze information at a position associated with the intersection coordinates of the display.

Accordingly, the performer can notice that the viewer in the remote location is looking at the performer just by looking at the display, such that the performer can react suitably, for example, look at the viewer and give a performance to the viewer. The image may be an avatar image of the viewer, for example.

In a case where intersection coordinates associated with a predetermined number of viewers or more are present in a predetermined region of the display, the control unit may cause a single predetermined image showing a viewer group to be output instead of an image associated with each of the viewers.

Accordingly, the information processing system can prevent images associated with a plurality of viewers from being displayed overlapping each other, which lowers the visibility of the performer.

The control unit may acquire attribute information indicating an attribute of the viewer together with the gaze parameter and change an output mode of the image in accordance with the attribute information.

Accordingly, the information processing system can change the image in accordance with the attribute of each viewer to thereby cause the performer to act suitably in accordance with it. Here, the attribute includes, for example, the age, gender, nationality, residence, viewing time, the number of views or number of purchases of content in which the same performer appears, and the distance from the performer in the content coordinate system. Changing the attribute mode includes, for example, adding a different color frame to the avatar image, changing the size of the avatar image, and changing the transparency.

The control unit may determine, on the basis of the converted gaze parameter, whether or not the viewer is looking at the performer, and change an output mode of the image in accordance with a result of the determination.

Accordingly, the information processing system can cause the performer to notice whether or not each of the viewers faces the performer, and can cause the performer to give a performance according to the gaze of the viewer, for example, give a performance toward the viewer looking toward the performer.

In a case where first intersection coordinates calculated at a first time and associated with a first viewer having first viewer identification information and second intersection coordinates calculated at a second time later than the first time and associated with the first viewer are different from each other, the control unit may cause the image associated with the viewer to be displayed while being moved at a trajectory linking the first intersection coordinates to the second intersection coordinates.

Accordingly, the information processing system can cause the performer to notice the movement of the viewer during the performance, and can cause the performer to give a performance according to the movement of the viewer.

The information processing system may further include a storage unit that stores information indicating a plurality of kinds of effects capable of being reproduced together with the image, the information being stored in association with effect identification information for identifying the effect. In this case, in a case where the control unit has received, from the terminal of the viewer, an effect reproduction request including the viewer identification information and the effect identification information, the control unit may cause an effect associated with the effect identification information to be output from a vicinity of the intersection coordinates associated with the viewer identification information.

Accordingly, the information processing system can cause the performer to notice the viewer's reaction or excitement, and can cause the performer to give a performance according to the viewer's reaction or excitement. Here, an effect that is a reproduction request target is associated with an arbitrary input (gesture, button, or the like) in the terminal of the viewer.

In a case where effect reproduction requests associated with the predetermined number of viewers or more are present in a predetermined region of the display, the control unit may cause a single predetermined effect to be output instead of effects associated with the respective viewers.

Accordingly, the information processing system can prevent images associated with a plurality of viewers from being displayed overlapping each other, which lowers the visibility of the performer.

In a case where the control unit has received, from the predetermined number of viewers or more, effect reproduction requests having identical effect identification information, the control unit may cause a single predetermined effect to be output instead of effects associated with the respective viewers.

Accordingly, the information processing system can cause the performer to notice excitement of all the viewers.

A plurality of loudspeakers may be installed at different positions on the display. In this case, in a case where the effect associated with the effect identification information included in the effect reproduction request is a sound effect, the control unit may cause the sound effect to be output from a loudspeaker provided in the vicinity of the intersection coordinates associated with the viewer identification information.

Accordingly, the information processing system can reproduce an effect as if the viewer is talking to the performer, and can cause the performer to notice it.

In a case where the control unit has acquired a gaze parameter indicating a gaze of the performer and determined that an absolute value of an inner product of a gaze vector obtained from the gaze parameter of the performer and a gaze vector obtained from the gaze parameter indicating the virtual gaze of the viewer is smaller than a predetermined threshold, the control unit may cause a predetermined effect to be output from a vicinity of the intersection coordinates associated with the viewer identification information.

Accordingly, the information processing system can cause the performer to notice that the performer and the viewer have looked at each other, and can cause to give a performance according to it.

The control unit may acquire a gaze parameter indicating a gaze of the performer, count, for each of the plurality of viewers, the number of times that an absolute value of an inner product of a gaze vector obtained from the gaze parameter of the performer and a gaze vector obtained from a gaze parameter indicating the virtual gaze of each of the viewers is smaller than a predetermined threshold, and cause the display to display a histogram in which a value associated with the number of times of each of the viewers is associated with a vicinity of the intersection coordinates associated with each of the viewers.

Accordingly, on the basis of this histogram, the performer can give a performance in a direction in which the frequency at which the performer and the viewer have looked at each other is low, to thereby increase the degree of satisfaction of all the viewers.

An information processing method according to an embodiment of the present technology includes:
  acquiring, from a terminal of a viewer on which content obtained by shooting a performance of a performer is being reproduced via a network in real time, a gaze parameter indicating a gaze of the viewer in a coordinate system of a space in which the viewer is present, the gaze parameter being acquired together with a viewer identification information for identifying the viewer;
  converting the acquired gaze parameter to a gaze parameter indicating a virtual gaze of the viewer in a coordinate system of a space in which the performer is present; and
  outputting, on the basis of the converted gaze parameter, gaze information indicating the virtual gaze of the viewer to an output device in the space in which the performer is present.

A program according to an embodiment of the present technology causes an information processing apparatus to execute the steps of:
  acquiring, from a terminal of a viewer on which content obtained by shooting a performance of a performer is being reproduced via a network in real time, a gaze parameter indicating a gaze of the viewer in a coordinate system of a space in which the viewer is present, the gaze parameter being acquired together with a viewer identification information for identifying the viewer;
  converting the acquired gaze parameter to a gaze parameter indicating a virtual gaze of the viewer in a coordinate system of a space in which the performer is present; and
  outputting, on the basis of the converted gaze parameter, gaze information indicating the virtual gaze of the viewer to an output device in the space in which the performer is present.

Advantageous Effects of Invention

As described above, in accordance with the present technology, it is possible to cause a performer who appears in content distributed in real time to give a performance according to a viewer's reaction in a remote location. However, such an effect does not limit the present technology.

BRIEF DESCRIPTION OF DRAWINGS

FIG. 8 A diagram showing a display example of the gaze information according to the movement of the viewers in the content distribution system.

FIG. 12 A table showing a relationship between effects with respect to the performer, which the viewer can request, and actions therefor in the content distribution system.

FIG. 13 A diagram showing a display example of effects to the performer from the viewers in the content distribution system.

FIG. 18 A diagram showing a case where the performer, a plurality of viewers, a display have a certain positional relationship in the content distribution system.

FIG. 22 A diagram showing an adjustment example of reproduction positions of the effect of FIG. 21.

MODE(S) FOR CARRYING OUT THE INVENTION

Hereinafter, embodiments according to the present technology will be described with reference to the drawings.
[Overview of System]

Figure 1:
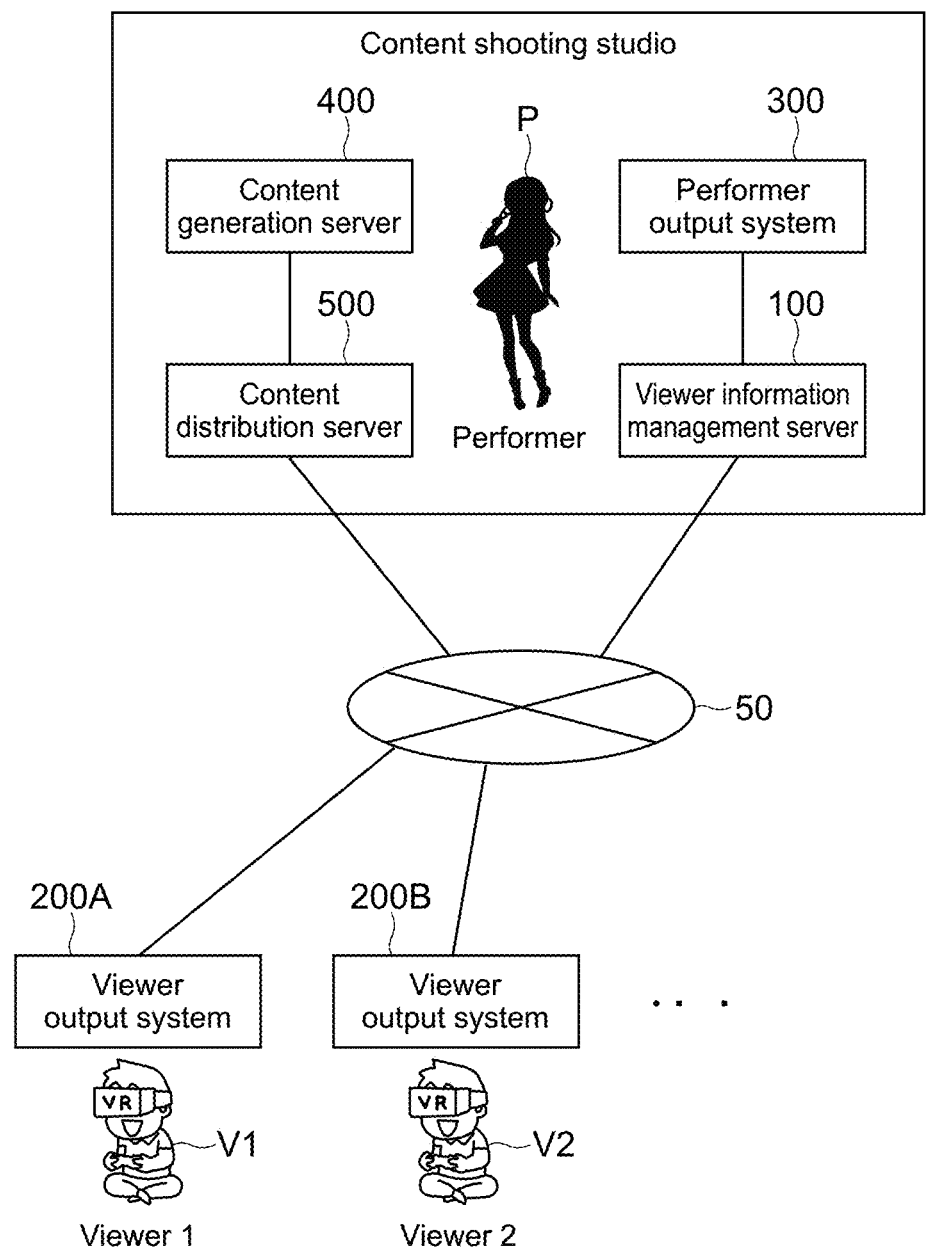
FIG. 1 A diagram showing a configuration of a content distribution system according to an embodiment of the present technology.

FIG. 1 is a diagram showing a configuration of a content distribution system according to an embodiment of the present technology.

Figure 2:
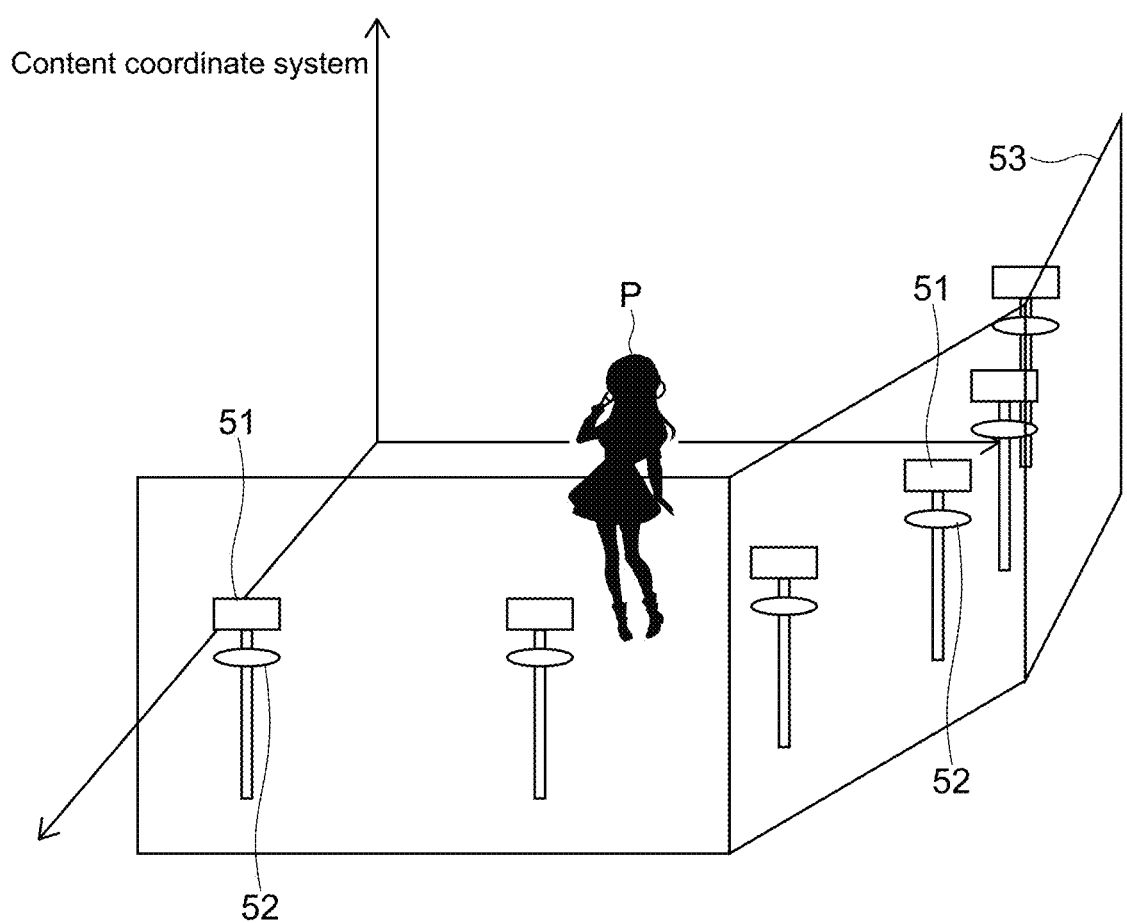
FIG. 2 A diagram showing an example of equipment installation in a studio of the content distribution system.

FIG. 1 is a diagram showing the overall configuration of the system. FIG. 2 is a diagram showing an example of equipment installation in a content shooting studio of the system.

As shown in both figures, this system includes a viewer information management server in the content shooting studio, a performer output system 300, a content generation server 400, a content distribution server 500, and a plurality of viewer output systems 200 connected to them through a network 50 such as the Internet.

The content generation server 400 uses the above-mentioned studio dedicated to content generation to generate content obtained by shooting the performance of a performer in real time. The generated content is streamed to viewers via the network 50.

The content distributed to the viewers is virtual reality (VR) content configured on the basis of 3D models and surround sound. As shown in FIG. 2, the studio includes shooting equipment including one or more cameras 51 and one or more microphones 52 for content generation, and the content generation server 400 generates distribution content on the basis of the captured data.

A viewer information management server 100 acquires and manages information regarding viewing states of the viewers, such as virtual gazes and virtual positions of the viewers, from the viewer output systems 200 as appropriate.

The performer output system 300 includes one or more displays 53 for outputting information regarding the viewer's viewing state to the performer who appears in the content.

The viewer information management server 100 sends information such as the viewer's viewing state received from the viewer output systems 200 to the content generation server 400, and the content generation server 400 can also change the distribution content in accordance with the information.

The content generated and changed by the content generation server 400 is distributed from the content distribution server 500 to each content viewer (viewer output system 200) by the content distribution server 500 through the network 50.
[Hardware Configuration of Viewer Information Management Server]

Figure 3:
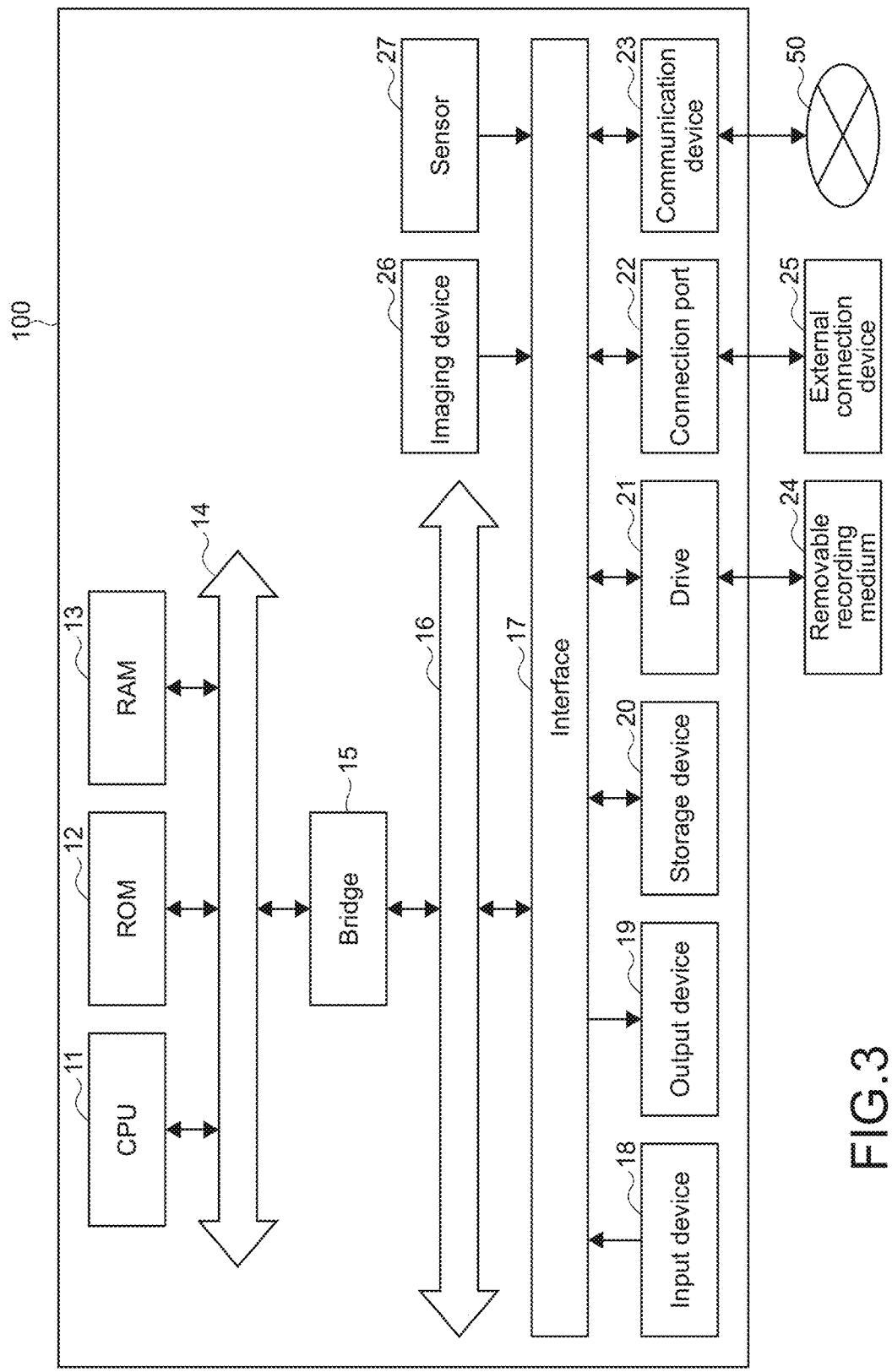
FIG. 3 A diagram showing a hardware configuration of a viewer information management server of the content distribution system.

FIG. 3 is a diagram showing a hardware configuration of the viewer information management server 100.

As shown in the figure, the viewer information management server 100 includes a central processing unit (CPU) 11, a read only memory (ROM) 12, and a random access memory (RAM) 13. Moreover, the viewer information management server 100 may include a host bus 14, a bridge 15, an external bus 16, an interface 17, an input device 18, an output device 19, a storage device 20, a drive 21, a connection port 22, and a communication device 23. In addition, the viewer information management server 100 may include an imaging device 26 and a sensor 27 as necessary. The viewer information management server 100 may include a processing circuit such as a digital signal processor (DSP), an application specific integrated circuit (ASIC), or a field-programmable gate array (FPGA) instead of or in addition to a CPU 11.

The CPU 11 functions as an arithmetic processing unit and a control unit and controls the overall operation of the viewer information management server 100 or a part thereof in accordance with various programs recorded on the ROM 12, the RAM 13, the storage device 20, or a removable recording medium 24. The ROM 12 stores programs used by the CPU 11, arithmetic parameters, and the like. The RAM 13 temporarily stores programs used in executing the CPU 11, parameters that change as appropriate in the execution, and the like. The CPU 11, the ROM 12, and the RAM 13 are connected to one another through the host bus 14 including an internal bus such as a CPU bus. In addition, the host bus 14 is connected via the bridge 15 to the external bus 16 such as a viewer information management server I (peripheral component interconnect/interface) bus.

The input device 18 is a device operated by a user, such as a touch panel, a physical button, a switch, and a lever, for example. The input device 18 may be, for example, a remote control device using infrared rays or other radio waves or may be an external connection device 25 such as a smartphone or a smart watch compatible with the operation of the viewer information management server 100. The input device 18 includes an input control circuit that generates an input signal on the basis of information input by the user and outputs the generated input signal to the CPU 11. By operating the input device 18, the user inputs various data to the viewer information management server 100 and instructs to perform a processing operation.

The output device 19 is configured as a device capable of notifying the user of obtained information by using a sense such as a sense of sight, a sense of hearing, and a sense of touch. The output device 19 can be, for example, a display device such as a liquid crystal display (LCD) and an organic electro-luminescence (EL) display, a voice output device such as a speaker, or the like. The output device 19 outputs the result obtained by the processing of the viewer information management server 100 as video such as text and image, audio such as voice and sound, vibration, and the like.

The storage device 20 is a data storage device configured as an example of a storage unit of the viewer information management server 100. The storage device 20 includes, for example, a magnetic storage device such as a hard disk drive (HDD), a semiconductor storage device, an optical storage device, and a magneto-optical storage device. The storage device 20 stores, for example, a program and various data executed by the CPU 11, various data acquired from the outside, data acquired from the viewer output system 200 (e.g., a gaze parameter to be described later, an avatar image of each viewer, and the like), and the like.

The drive 21 is a reader/writer for the removable recording medium 24 such as a magnetic disk, an optical disc, a magneto-optical disc, and a semiconductor memory, and is built in or externally attached to the viewer information management server 100. The drive 21 reads information recorded on the mounted removable recording medium 24 and outputs the read information to the RAM 13. Moreover, the drive 21 writes a record in the mounted removable recording medium 24.

The connection port 22 is a port for connecting the device to the viewer information management server 100. The connection port 22 may be, for example, a universal serial bus (USB) port, an IEEE1394 port, a small computer system interface (SCSI) port, or the like. Alternatively, the connection port 22 may be an RS-232C port, an optical audio terminal, an HDMI (high-definition multimedia interface) (registered trademark) port, or the like. By connecting the external connection device 25 to the connection port 22, various data can be exchanged between the viewer information management server 100 and the external connection device 25.

The communication device 23 is, for example, a communication interface including a communication device and the like for connecting to the communication network 50. The communication device 23 may be, for example, a communication card or the like for a local area network (LAN), Bluetooth (registered trademark), Wi-Fi, or wireless USB (WUSB). Alternatively, the communication device 23 may be a router for optical communication, a router for asymmetric digital subscriber line (ADSL), a modem for various types of communication, or the like. The communication device 23 sends and receives signals and the like to and from the Internet and other communication devices by using a predetermined protocol such as TCP/IP. Moreover, the communication network 50 connected to the communication device 23 is a network connected with a wire or wirelessly, and can include, for example, the Internet, a home LAN, infrared communication, radio-wave communication, satellite communication, and the like.

The imaging device 26 is, for example, a camera that images a real space and generates a captured image by using various members such as an image sensor including a complementary metal oxide semiconductor (CMOS) and a charge coupled device (CCD) and a lens for controlling the formation of an object image on the image sensor. The imaging device 26 may capture a still image or may capture a moving image. The sensor 27 is various sensors such as an acceleration sensor, an angular velocity sensor, a geomagnetic sensor, an illuminance sensor, a temperature sensor, an atmospheric pressure sensor, a depth sensor, and a sound sensor (microphone), for example.

Each of the components described above may be configured using general-purpose members or may be configured by hardware specializing in the function of each component. Such a configuration may be changed as appropriate in accordance with the technical level at the time of implementation.

Although not shown in the figure, the viewer output system 200, the performer output system 300, the content generation server 400, and the content distribution server 500 also have hardware for functioning as a computer similar to that of the viewer information management server 100.

[Operation of Content Distribution System]

Next, an operation of content distribution system configured as described above will be described. The operation is performed in cooperation with hardware such as the CPU 11 and the communication unit of the viewer information management server 100 and software stored in the ROM 12, the RAM 13, the storage device 20, or the removable recording medium 24.

Figure 4:
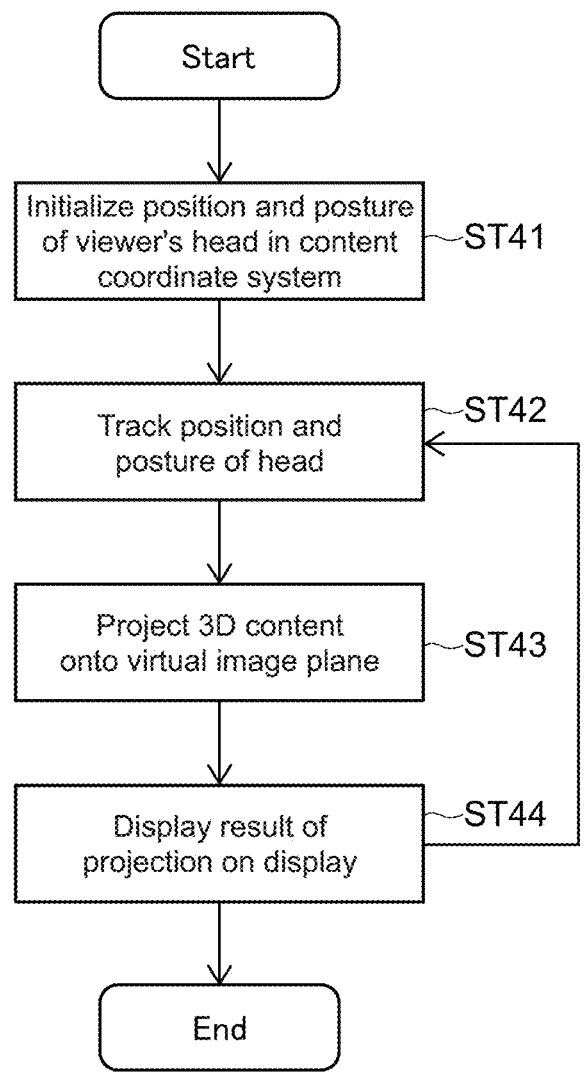
FIG. 4 A flowchart showing a flow of content distribution processing by the content distribution system.
Figure 5:
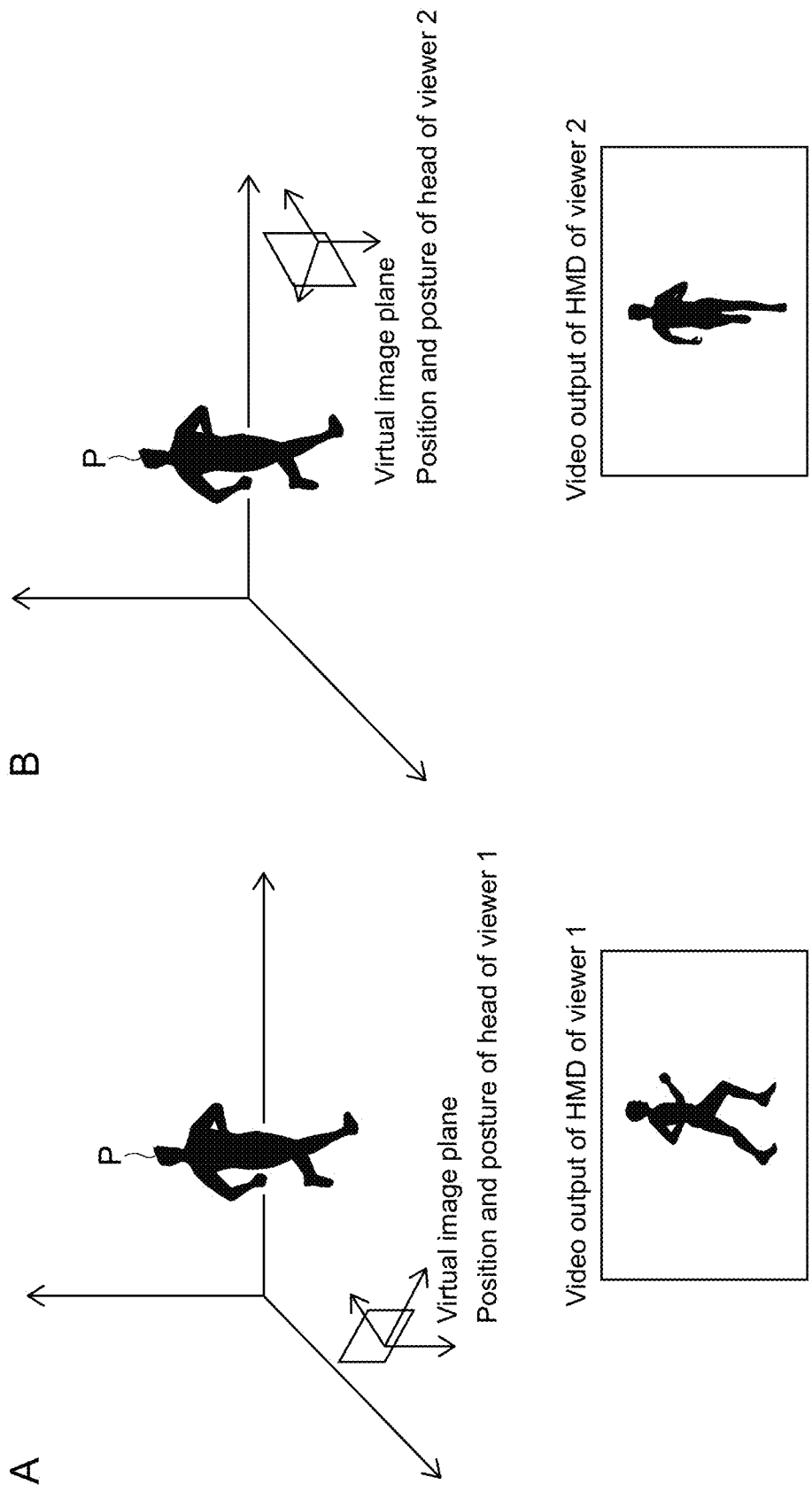
FIG. 5 A diagram showing display examples when there are viewers different in position and posture with respect to the content in the content distribution system.

FIG. 4 is a diagram showing a flowchart of content distribution processing. FIG. 5 is a diagram showing display examples of the content when there are viewers different in position and posture with respect to the content.

The content viewer receives the content and views the content through the viewer output system of each viewer. Here, the viewer output system 200 is, for example, a head-mounted display having a head tracking function capable of estimating the position and posture of the viewer's head.

As shown in FIG. 4, the viewer output system 200 initializes the position and posture of the viewer's head in a content coordinate system (a coordinate system in a space in which the performer is present) (Step 41) and estimates the position and posture of the viewer's head in the content coordinate system by the use of the head tracking function (Step 42).

Subsequently, the viewer output system 200 projects 3D content distributed in accordance with the position and posture onto a virtual image plane (Step 43) and outputs the projected content to a display (Step 44).

Examples of a technique for realizing the head tracking function can include a simultaneous localization and mapping (SLAM) technique using cameras and inertial measurement unit (IMU) sensors.

In general, binocular stereoscopic vision used for viewing VR content requires positions and postures of the viewer's left and right eyes, which can be calculated by using an offset from the estimated head position to both eyes.

As shown in FIG. 5, a viewer 1 viewing the content from the right side in the content coordinate system (FIG. 5A) and a viewer 2 viewing the content from the front (FIG. 5B) see the content in different ways depending on the positions and postures of the heads.

With or without the head tracking function, the viewer can also virtually move the head position and posture by the use of an input device such as a controller instead of the viewer output system 200 estimating and using the position and posture of the viewer's actual head.

The content distribution system of this embodiment is capable of presenting, to the performer, virtual gaze information of the viewer (including virtual position information of the viewer) and effects indicating the viewer's reaction to the performer during the content distribution processing. On the other hand, the content distribution system is capable of giving effects indicating the viewer's reaction to the content during the content distribution processing. Hereinafter, details of these processes will be described.

[Presentation of Viewer's Gaze Information to Performer]

Figure 6:
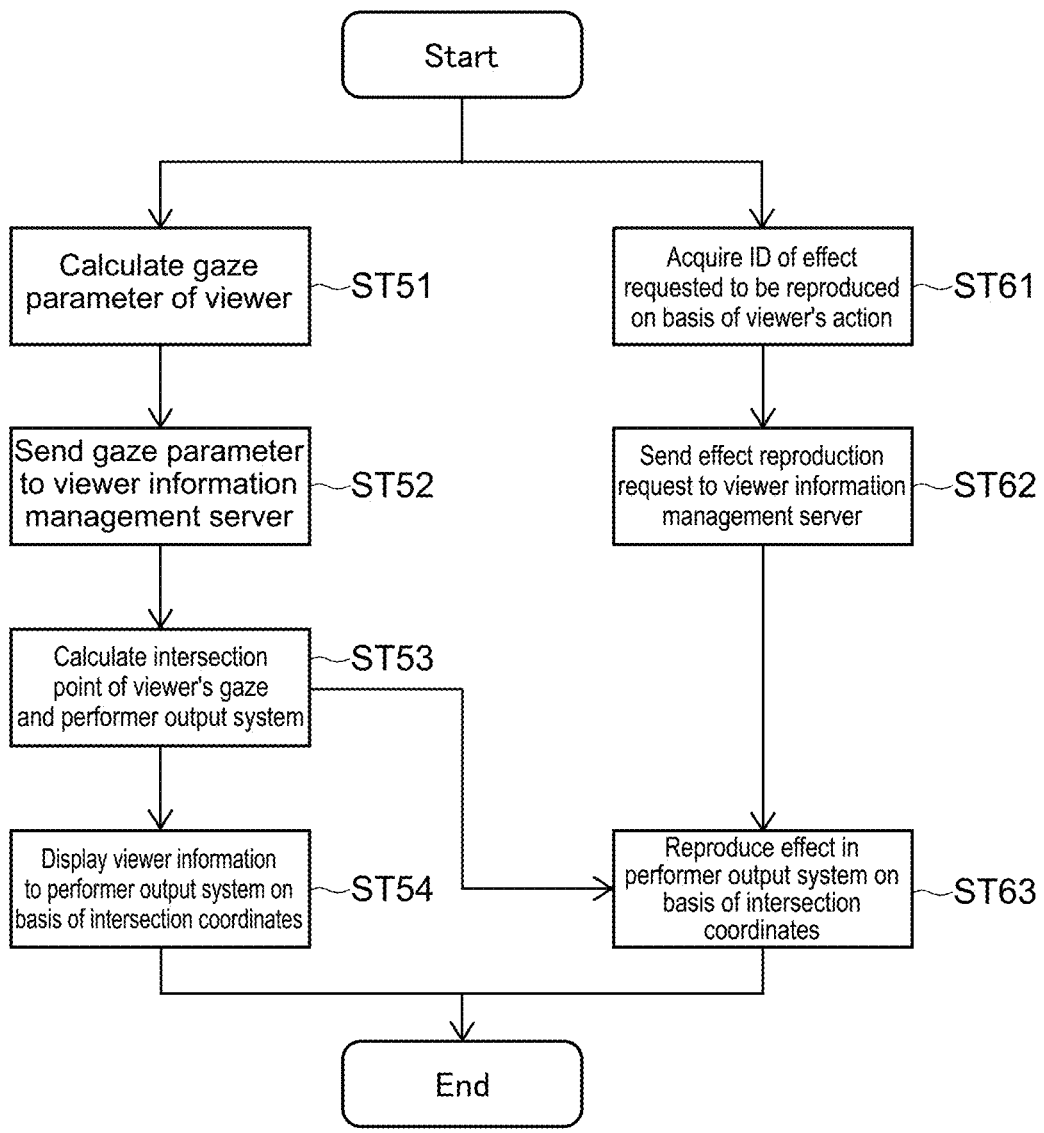
FIG. 6 A flowchart showing a flow of viewer information display processing by the content distribution system.

FIG. 6 is a flowchart showing a flow of processing of presenting gaze information of the viewer and effects to the performer.

As shown in the flow on the left side of the figure, first, the viewer output system 200 calculates the viewer's gaze parameter in the content coordinate system (Step 51).

The viewer output system 200 may obtain this by converting a gaze parameter defined in advance in a head-mounted display coordinate system (a coordinate system of a space in which the viewer is present) into the content coordinate system. Alternatively, in a case where the viewer output system 200 has a device that estimates a gaze direction of the viewer in real time, the viewer output system 200 may obtain this by converting the parameter into the content coordinate system.

Although gaze parameters may be output separately for the right and left eyes, it is here assumed that the gaze parameters are limited to a single parameter in some way, e.g., selecting one of the right and left eyes or obtaining the average of the right and left eyes. Alternatively, based on the assumption that the viewer always faces the direction of the performer, the viewer output system 200 may use, for example, a straight line connecting the position of the performer's head and the position of the viewer's head as the gaze parameter instead of using the viewer's eye position. Alternatively, the viewer output system 200 may also determine a gaze parameter with a particular orientation in the device coordinate system of the head-mounted display as a gaze direction.

The gaze parameter in the content coordinate system may be calculated not by the viewer output system 200 but by the viewer information management server 100 on the studio side. In this case, the viewer output system 200 sends the viewer's gaze parameter in the head-mounted display coordinate system to the viewer information management server 100, and the viewer information management server 100 converts the gaze parameter into the gaze parameter of the content coordinate system.

Subsequently, the viewer output system 200 sends the viewer's gaze parameter expressed in the content coordinate system to the viewer information management server 100 (Step 52).

The viewer information management server 100 performs processing required by the performer output system 300 on the gaze parameter sent from each viewer.

For example, when outputting an avatar image of a viewer as gaze information in the performer output system 300, the viewer information management server 100 may perform processing of linking the gaze parameter and the avatar image of the viewer who has sent the information.

The viewer information management server 100 (CPU 11) has position and posture information in the content coordinate system of a display 53 installed in the studio, and calculates intersection coordinates of the display 53 and the viewer's gaze on the basis of the viewer's gaze parameter expressed in the content coordinate system (Step 53).

For example, in a case where the performer output system 300 is constituted by the plurality of displays 53, the viewer information management server 100 is capable of calculating intersection coordinates of the display 53 and the gaze by expressing each display 53 by a plane equation and expressing the viewer's gaze parameter by a linear equation.

This can also be applied to a case where the display 53 is a curved surface. Alternatively, the viewer information management server 100 may determine the intersection coordinates in each display coordinate system after converting the gaze parameter into each display coordinate system.

Next, the viewer information management server 100 (CPU 11) causes the performer output system 300 to output the viewer's gaze information to the display 53 in a form that the performer can recognize, on the basis of the calculated intersection coordinates (Step 54).

Figure 7:
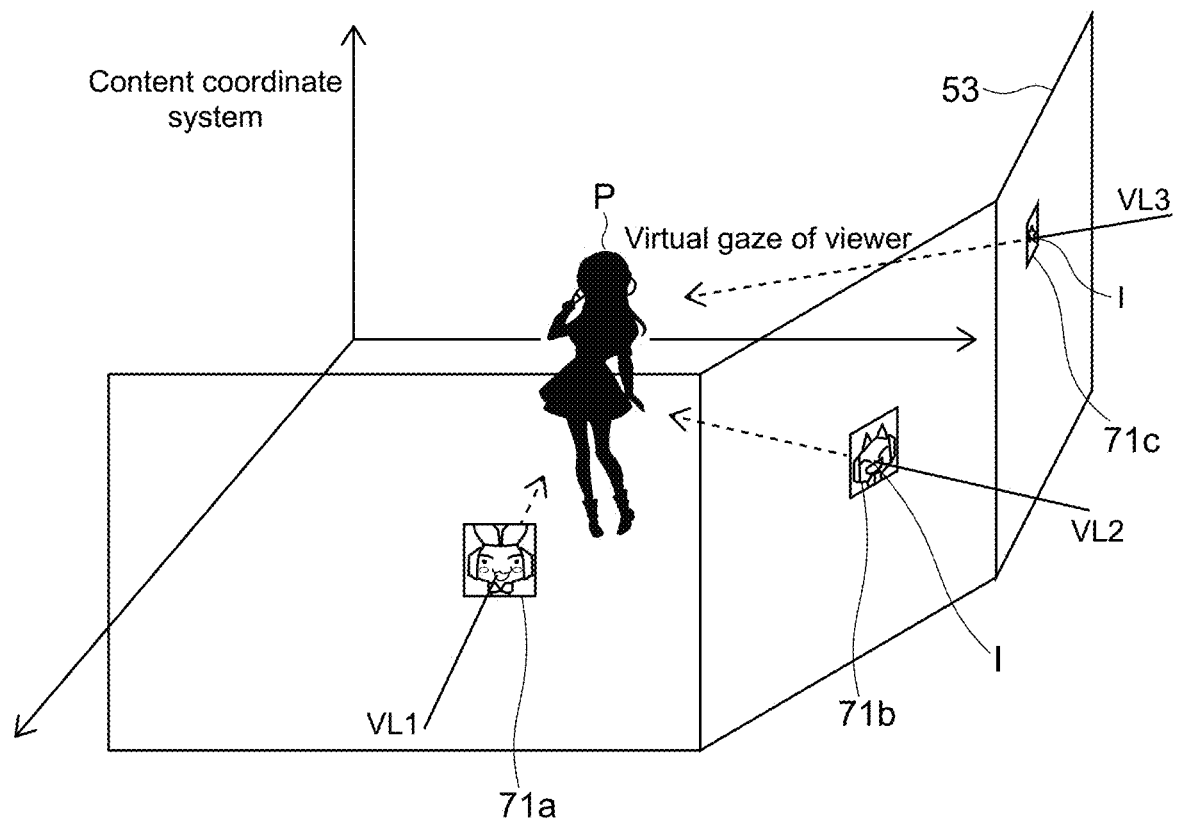
FIG. 7 A diagram showing a presentation example of gaze information of viewers with respect to the performer in the content distribution system.

This can be realized, for example, as shown in FIG. 7, by converting intersection coordinates I expressed in the content coordinate system into the display coordinate system and displaying an avatar image 71 of each viewer at the corresponding position. In the embodiment shown in the figure, avatar images 71a, 71b, and 71c associated with intersection coordinates I of a virtual gaze VL1 of the viewer 1, a virtual gaze VL2 of the viewer 2, and a virtual gaze VL3 of a viewer 3 and the display 53, respectively, are displayed.

As shown in FIG. 8, by viewing the avatar image 71 displayed on the display 53, a performer P can recognize the gaze of a viewer V present in a remote location and a direction in which the viewer V is present in real time, and can take appropriate actions such as looking toward that area or giving a performance toward that area. In the example shown in the figure, as the viewer V moves a gaze L the right to the left in time series with t1, t2, t3 as shown in B of the figure, a virtual gaze VL also moves as shown in A of the figure, and the avatar image 71 also moves correspondingly.

Moreover, this also allows the viewer V to have a communication experience (e.g., gazing at each other) as if the performer P and the viewer V were physically close together.

[Modified Example Related to Presentation of Gaze Information]

Hereinafter, a modified example related to presentation of the viewer's gaze information to the performer will be described.

As the number of viewers increases, the viewer's gaze may concentrate on the same coordinates on the display 53 of the performer output system 300. At this time, when the avatar image 71 or the like set for each viewer is displayed, the plurality of avatar images 71 overlap with each other, for example, and the visibility of the performer is lowered.

In such a case, the viewer information management server 100 may cause the performer output system 300 to display other images or the like expressing the concentration of the gazes of the plurality of viewers in place of the plurality of avatar images 71 for the respective viewers.

For example, in a case where viewpoints of X or more people are gathered in a region of a predetermined area or less on the display 53, the performer output system 300 may display an image A in place of a group of avatar images 71 of the viewers, and in a case where viewpoints of Y or more people are gathered in the region, the performer output system 300 may display an image B different from the image A in place of a group of avatar images 71 of the viewers. Alternatively, the performer output system 300 may display a heat map indicating a gaze concentration level on the display 53 instead of the avatar image 71.

The viewer information management server 100 may change or process the viewer's avatar image 71 to be displayed on a display of a viewer output system 300 by using viewer attribute information managed by the viewer information management server 100 or viewer attribute information added to the gaze parameter information acquired from the viewer output system 200.

For example, the viewer information management server 100 may add a frame of a different color to the avatar image 71, change the size of the avatar image 71, or change the transparency in accordance with the viewer's age, gender, nationality, residence, viewing time, the number of views or number of purchases of content in which the same performer appears, the distance from the performer in the content coordinate system, or other parameters associated with the viewer.

A device other than the display 53 may be used as a video output device of the performer output system 300. For example, in a case of using a projector, the viewer information management server 100 is capable of calculating a position where the viewer's avatar image 71 or the like is to be drawn in the same manner as in the case of using the display 53 by expressing a projection plane of the projector, on which images are projected, in the content coordinate system.

Figure 9:
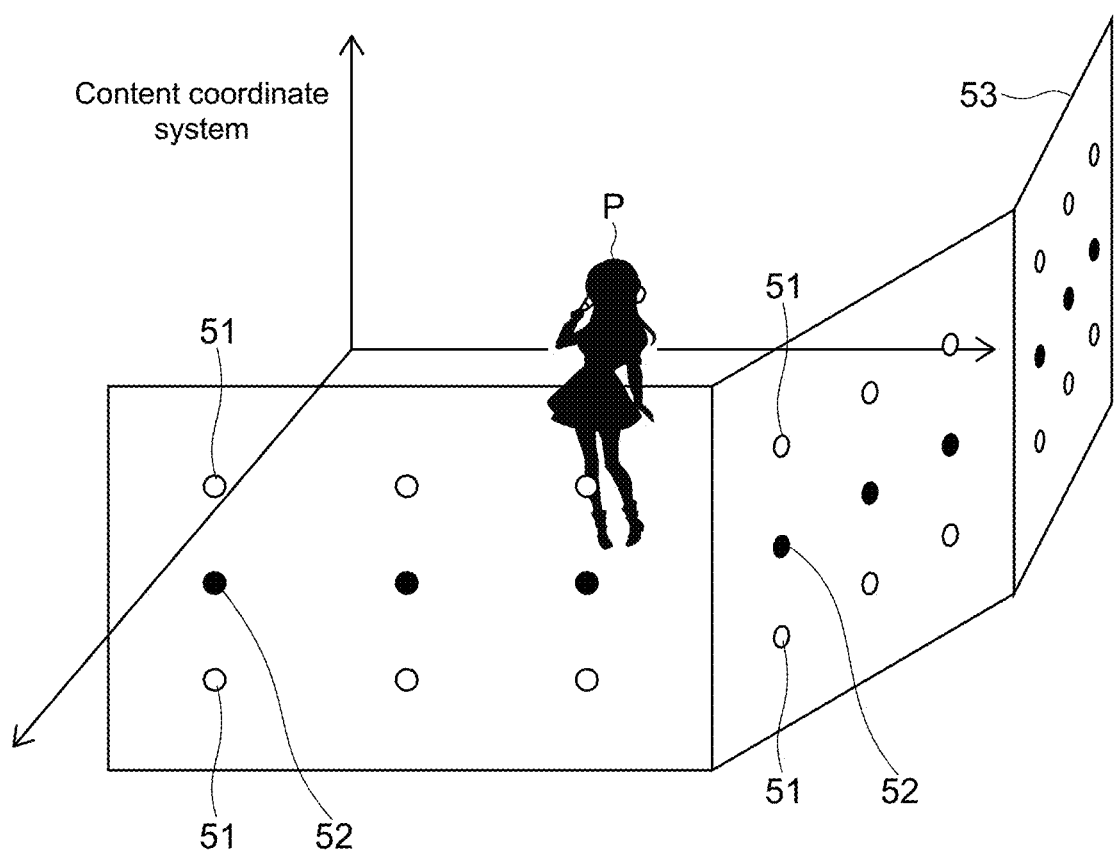
FIG. 9 A diagram showing a modified example of the example of equipment installation in the studio of the content distribution system.

Alternatively, in order to improve the visibility of the display 51 to the performer, a display device in which a plurality of cameras 51 and a plurality of microphones 52 are embedded (e.g., in a matrix shape) in the same plane as the display 53 may be used as shown in FIG. 9 instead of the configuration as shown in FIG. 2.

Figure 10:
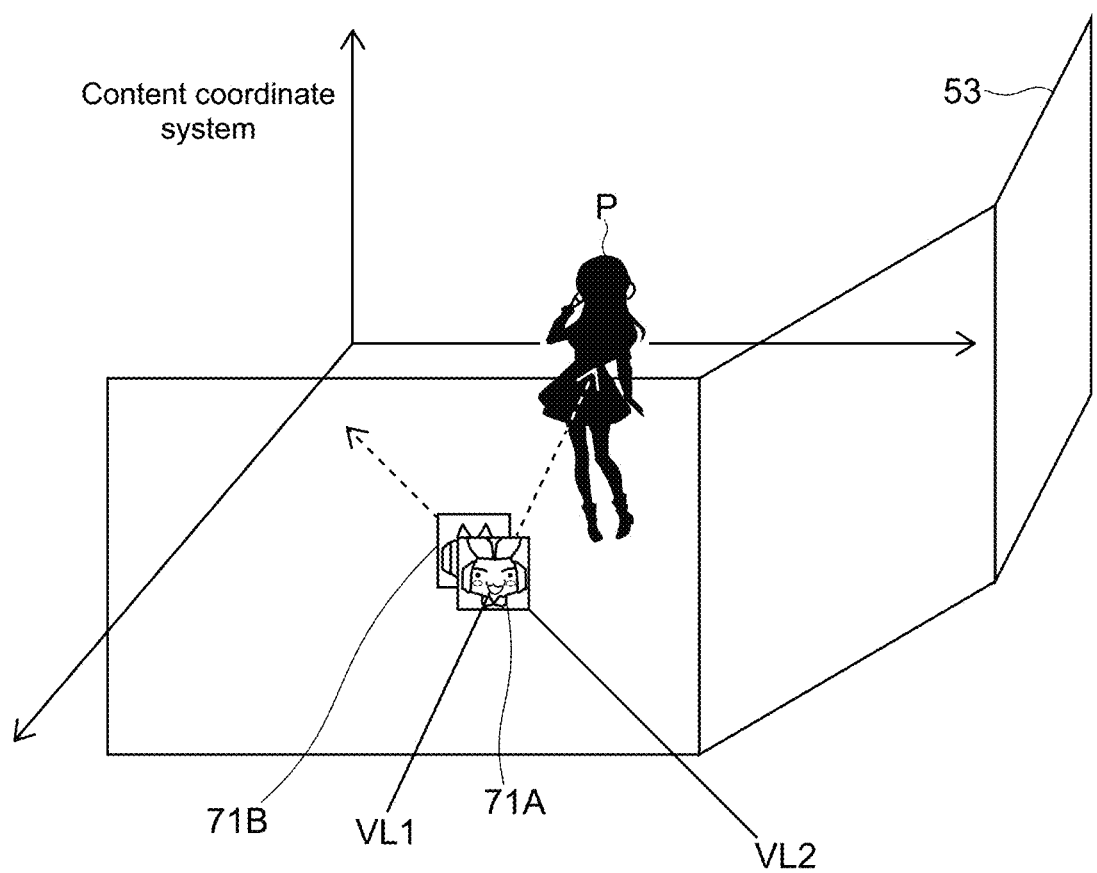
FIG. 10 A diagram showing an example in which information regarding different viewers having different gazes is displayed at the same position in the content distribution system.

As shown in FIG. 10, even if information of different viewers, for example, the avatar images 71 is displayed at the same position on the display 53 in the performer output system 300, the viewers may not be looking toward the performer P (the gaze VL1 is directed toward the performer P while the gaze VL2 is not directed toward the performer P).

Figure 11:
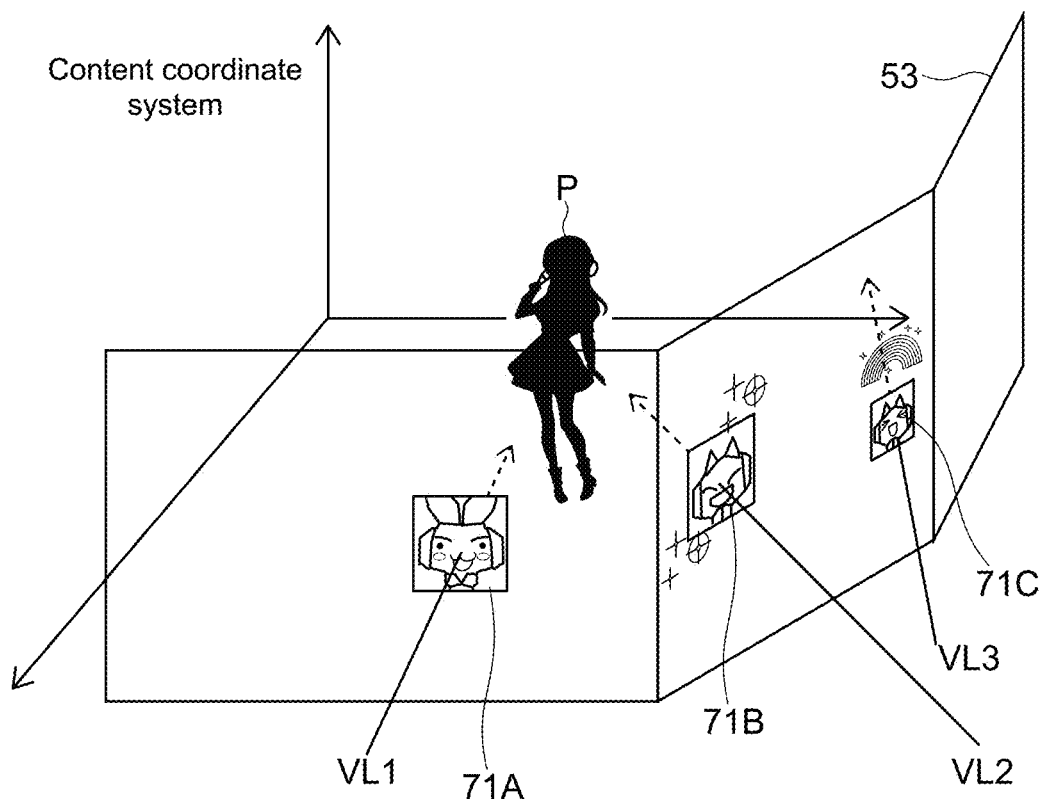
FIG. 11 A diagram showing a display example of the gaze information according to whether or not the gaze of the viewer is directed toward the performer in the content distribution system.

Therefore, in order to send more accurate gaze information of the viewer V to the performer P, for example, as shown in FIG. 11, the viewer information management server 100 may change the size or the frame color of the avatar image 71 or may hide the avatar image 71 itself between a case where the gaze of the viewer V is directed toward the performer P in the content coordinate system and a case where the gaze of the viewer V is not directed toward the performer P.

In the embodiment shown in the figure, the virtual gazes VL1 and VL2 are directed toward the performer P, and avatar images 71A and 71B corresponding thereto are displayed in the normal size while the virtual gaze VL3 is not directed toward the performer P, and an avatar image 71C corresponding thereto is displayed smaller than the avatar images 71A and 71B.

Whether or not the viewer's gaze faces the performer P can be determined on the basis of, for example, whether or not the performer is included in an arbitrary-size viewing cone centered on the viewer's gaze.

The position of the viewer information (avatar image 71) displayed on the performer output system 300 may be updated at arbitrary intervals. The viewer information management server 100 may move the viewer information to move on a trajectory connecting two intersections in a case where an intersection position c(t) of a certain viewer's gaze and the display differs from an intersection position c(t−1) for the same viewer that has been calculated just before.

[Presentation of Viewer Effects to Performer]

Next, a description will be given of a means for sending information such as reactions and excitement of viewers to a performer by additionally displaying information other than the viewers' gazes in the performer output system 300.

By obtaining this information, the performer can give an appropriate performance to the viewers. A content distributor generates effects as in an effect table in A of FIG. 12 that allows the viewers to make a reproduction request to the performer output system. The effect table is one in which an effect ID for identifying the effect is associated with the effect description indicated by it. The effect table is stored in the storage device 20 of the viewer information management server 100, for example.

Each viewer registers an action for issuing a reproduction request for each effect, as in the viewer action tables shown in B1 to B3 of FIG. 12, in accordance with the viewer's input device. The action here means the input of a particular command or motion to the device of the viewer output system 200.

As shown in the flow on the right side of FIG. 6, the viewer output system 200 first acquires the effect ID of an effect that is a reproduction request target on the basis of the viewer's action (Step 61).

For example, the viewer 1 in B of FIG. 12 repeatedly moves the head up and down, to thereby issue a reproduction request of an effect in the performer output system 300 with respect to the effect having the effect ID: 1000. Viewers in a viewing environment with a head-tracking function may use head movement for the request like the viewer 1 in B of FIG. 12 or viewers using motion controllers may use a particular motion for the request like the viewer 2.

Subsequently, the viewer output system 200 sends an effect reproduction request associated with the effect ID to the viewer information management server 100 (Step 62).

The effect reproduction request of each viewer is sent to the viewer information management server 100 as data in which a viewer ID for identifying the viewer is associated with the effect ID.

Then, the viewer information management server 100 (CPU 11) reproduces the effect associated with the effect ID at a position (e.g., in the vicinity of the avatar image 71) associated with the intersection coordinates of the performer output system 300 on the basis of the intersection coordinates (Step 63).

For example, as shown in FIG. 13, a visual effect 72 of the effect ID: 1004 (rainbow) of A of FIG. 12 is reproduced in response to a reproduction request from the viewer 1, a visual effect 72 of the effect ID: 1003 (star) of A of FIG. 12 is reproduced in response to a reproduction request from the viewer 2, and a visual effect 72 of the effect ID:1000 ("cute" as a balloon comment) of A of FIG. 12 is reproduced in response to a reproduction request from the viewer 3.

[Modified Example of Effect Presentation Processing for Performer]

Hereinafter, a modified example of effect presentation processing for the performer will be described.

Similar to the above-mentioned gaze information, when the number of viewers increases, effect reproduction requests may be concentrated in the vicinity of the same coordinates of the display 51 of the performer output system 300. At this time, when the requested effect is reproduced for each viewer, the plurality of effects overlap with each other, for example, and the visibility of the performer lowers.

In such a case, the viewer information management server 100 may cause the viewer output system 300 to reproduce another effect expressing the concentration of the plurality of effect reproduction requests in place of the effects of the plurality of viewers.

For example, when the same effect reproduction request is received from X or more people in a predetermined area on the display 53, the performer output system 300 may reproduce a special effect expressing the concentration of the effect in place of the effects of the respective viewers.

The viewer information management server 100 may control the size of the effect reproduced by the viewer output system 300 and the type of effect that can be requested by using the viewer attribute information managed by the viewer information management server 100 or the viewer attribute information added to the gaze parameter information acquired from the viewer output system 200.

For example, the viewer information management server 100 may control the type of effect that can be requested in accordance with the viewer's viewing time, the number of views and the number of purchases of content in which the same performer appears, and other parameters associated with the viewer.

The viewer information management server 100 may reproduce an effect that is not shifted to the gaze position in order to express the excitement of all the viewers.

For example, when the viewer information management server 100 receives the same effect reproduction requests from a specific number viewers or viewers larger in number than the specific number viewers at a specific timing, the viewer information management server 100 may cause the performer output system 300 to reproduce a special effect (e.g., a visual effect displayed on the entire display 53) indicating it.

The performer output system 300 may include an audio reproduction device such as a speaker. This allows the viewer to request not only visual effects but also sound effects.

For example, by using a display device in which a plurality of speakers is embedded in the display 53 in the same manner as in FIG. 9, it is possible to reproduce a sound effect requested by a viewer from a speaker in the vicinity of the avatar image 71 (intersection coordinates I) associated with the viewer who issued the sound effect reproduction request.

[Adding Effects to Content]

Next, a description will be given of a method of notifying, in real time, viewers viewing the same distribution content of how they are reacting by adding a specific effect to the distribution content in accordance with the viewer's action.

Similar to the effects presented to the performer, the content distributor generates effects that the viewer can request to add to the distribution content. Each viewer similarly registers actions to issue the respective effect addition requests in accordance with the viewer's input device. A table related to the effects (e.g., in the same format as that shown in FIG. 12) is also stored in the storage device 20 of the viewer management server 100, for example.

Figure 15:
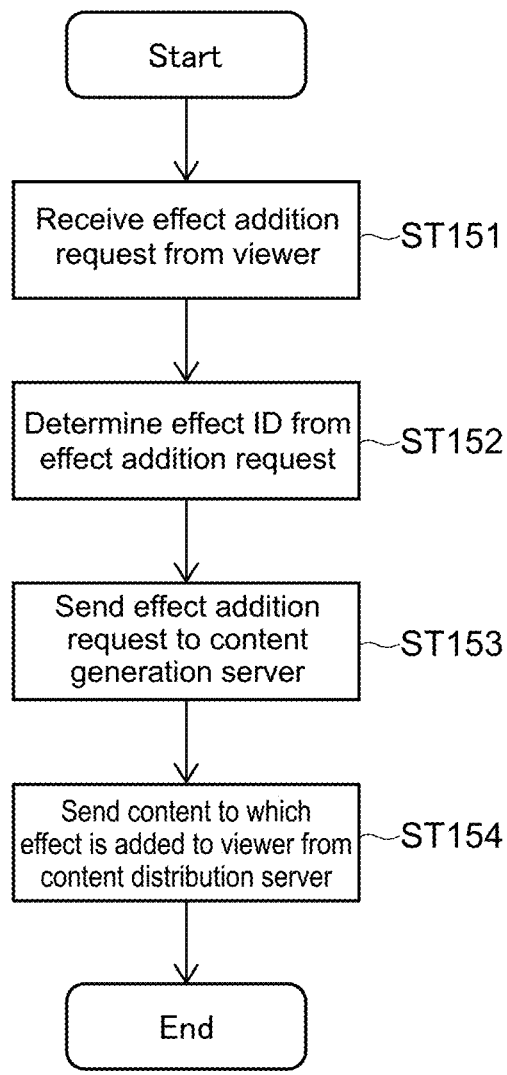
FIG. 15 A flowchart showing a flow in which the content distribution system adds an effect to the content in accordance with a request from the viewer.
Figure 16:
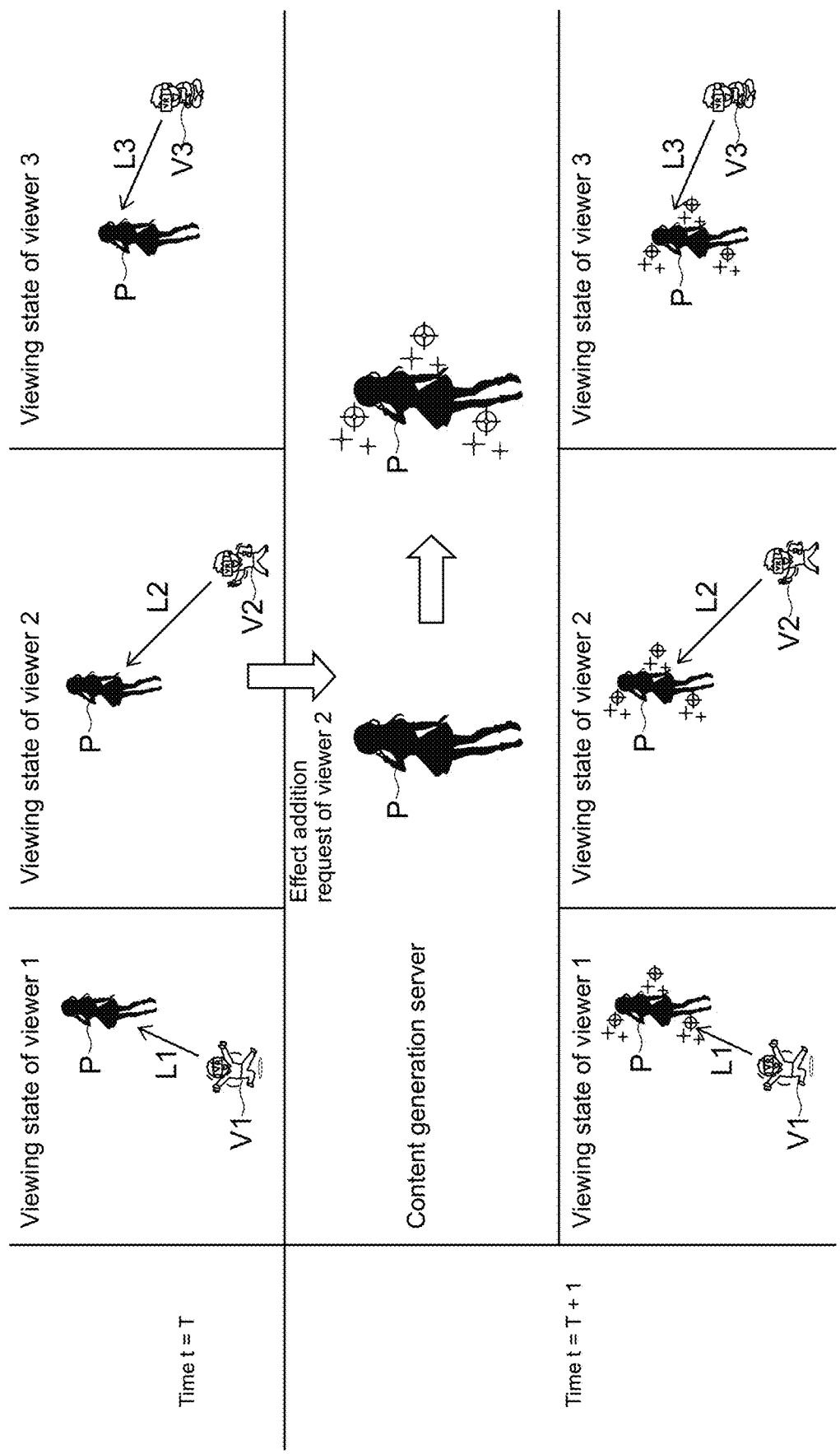
FIG. 16 A conceptual diagram showing a flow in which the content distribution system adds an effect to the content in accordance with a request from the viewer.

FIG. 15 is a flowchart showing a flow from an effect addition request from a certain viewer to distribution of VR content having an added effect to the viewer. FIG. 16 is a conceptual diagram showing the flow.

As shown in FIG. 15, the CPU 11 of the viewer information management server 100 first receives the effect addition request of each viewer from the viewer output system 200 of each viewer (Step 151). The effect addition request is received as data in which the viewer ID is associated with the effect ID.

Subsequently, the CPU 11 identifies the effect ID from the effect addition request (Step 152).

Subsequently, the CPU 11 sends the effect addition request including the effect ID to the content generation server 400 (Step 153).

In Step 154, the content generation server 400 distributes the content, to which the effect associated with the effect ID has been added, to the viewer output system 200 from the content distribution server 500.

The effect addition request may be sent directly to the content generation server 400 without passing through the viewer information management server 100.

As shown in FIG. 16, when a visual request, for example, to make the surroundings the performer P shine is sent from the viewer 2 to the viewer information management server 100, the effect is added to the content by the content generation server 400 and distributed to the viewer output system 200 of each viewer. Thus, the respective viewers can visually recognize the added effect from the different gazes L1, L2, and L3. In particular, the viewers 1 and 3 can know in real time how the viewer 2 is reacting to the content.

[Modified Example Related to Adding Effects to Content]

Hereinafter, a modified example of processing of adding effects to the content will be described.

A modification similar to that described in the processing of presenting effects to the performer can be made.

That is, similarly to the gaze information and effects presented to the performer, if the number of viewers increases, the effect addition requests may concentrate in the vicinity of the same position of the content (e.g., in the periphery of the performer). At this time, if the requested effect is added to each viewer, the visibility of the viewer is reduced by overlapping multiple effects or the like.

In such a case, the viewer information management server 100 may cause the content generation server 400 to add another effect expressing the concentration of the plurality of effect addition requests in place of the effects of the plurality of viewers.

For example, in a case where the same effect addition requests are received from X or more people, the content generation server 400 may replace the effects of the respective viewers with a special effect expressing the effect concentration.

The viewer information management server 100 may control the size of the effect added to the content and the type of the effect that can be requested by using the viewer attribute information managed by the viewer information management server 100 or the viewer attribute information added to the gaze parameter information acquired from the viewer output system 200.

For example, the viewer information management server 100 may control the type of effect that can be requested to be added in accordance with the viewer's viewing time, the number of views and the number of purchases of content in which the same performer appears, and other parameters associated with the viewer.

Moreover, when the content generation server 400 receives the same effect reproduction requests from specific number or more viewers at a specific timing, the content generation server 400 may add a special effect (e.g., a visual effect displayed on the entire content) indicating it.

The viewer information management server 100 may change the VR content by using the viewer attribute information managed by the viewer information management server 100 or the viewer attribute information added to the gaze parameter information without voluntarily issuing requests by the viewers.

Figure 17:
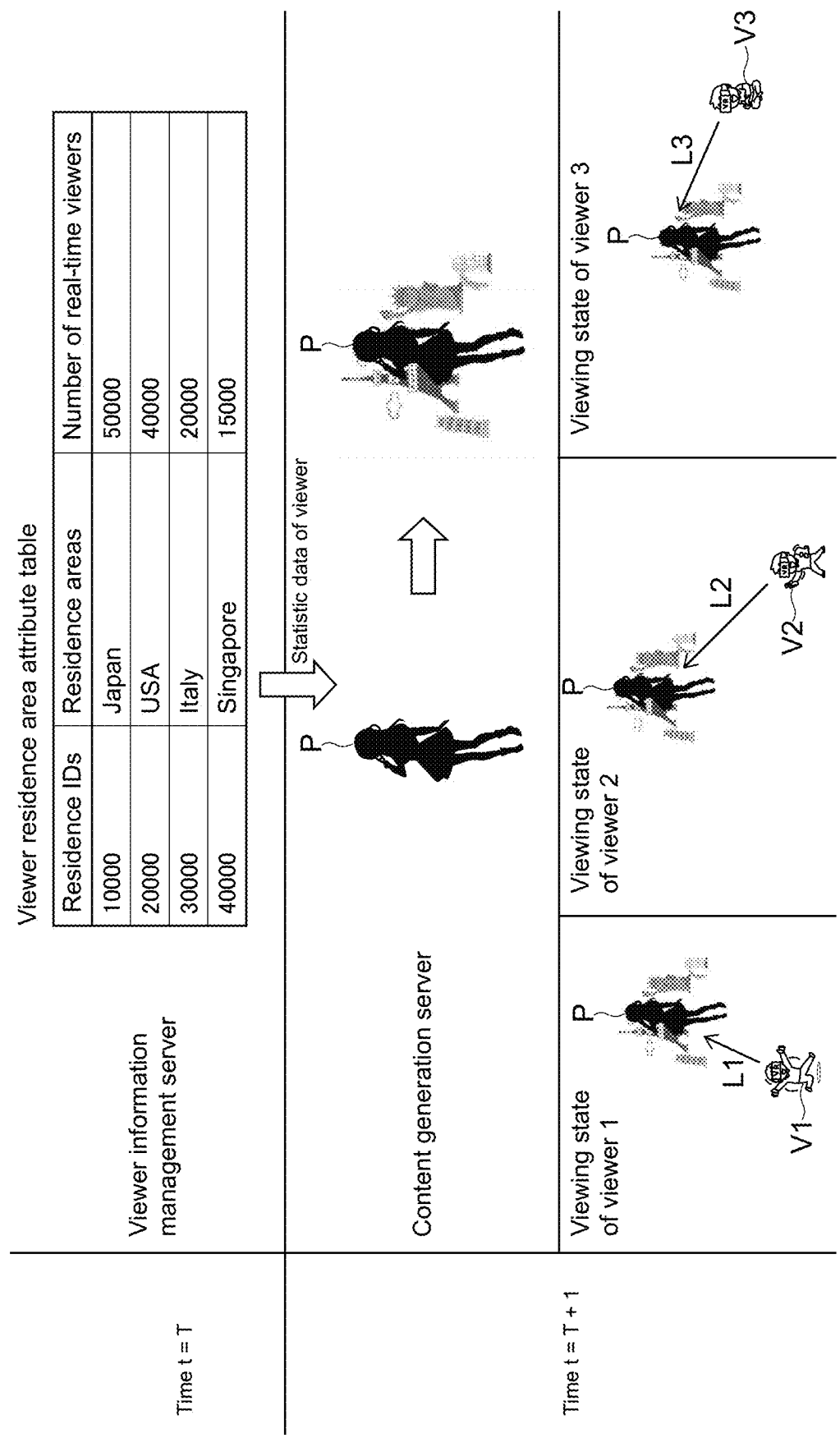
FIG. 17 A diagram showing a modified example of the processing of adding an effect to the content in the content distribution system.

For example, as shown in FIG. 17, the viewer information management server 100 stores a viewer residence area attribute table indicating the number of viewers for each residence area of viewers in various worldwide places. Then, the content generation server 400 may generate content by changing the display size of a 3D model such as a landmark representing each place (e.g., the Tokyo Tower in Japan, the Statue of Liberty in the United States, the Tower of Pisa in Italy, and Merlion in Singapore, etc.) in accordance with the number of viewers in the residence and combining the 3D model with the background of the performer P.

In the example of the figure, since the number of viewers is larger in the order of Japan, the United States, Italy, and Singapore, the size of the 3D model is set to be larger in the order of the Tokyo Tower, the Statue of Liberty, the Tower of Pisa, and Merlion as the background of the content.

[Expansion Example for Adding Effects to Content]

By using the gaze information and the position information of the viewers and the gaze information and the position information of the performer, it is possible to share the viewing states among the viewers and to add effects to the content more effectively. Hereinafter, several examples will be described.

Sharing of Viewing States Between Viewers

As one of the methods of sharing the viewing states, a method of adding the viewing state of another viewer (e.g., the position of the viewer) to the distribution content and viewing the content is conceivable. At this time, in a case where the viewing state of the other viewer is unconditionally added to the distribution content, there is a problem that added content (effect) appears at a position that prevents the viewing of the distribution content or that the distribution content is hidden by the added content.

Figure 19:
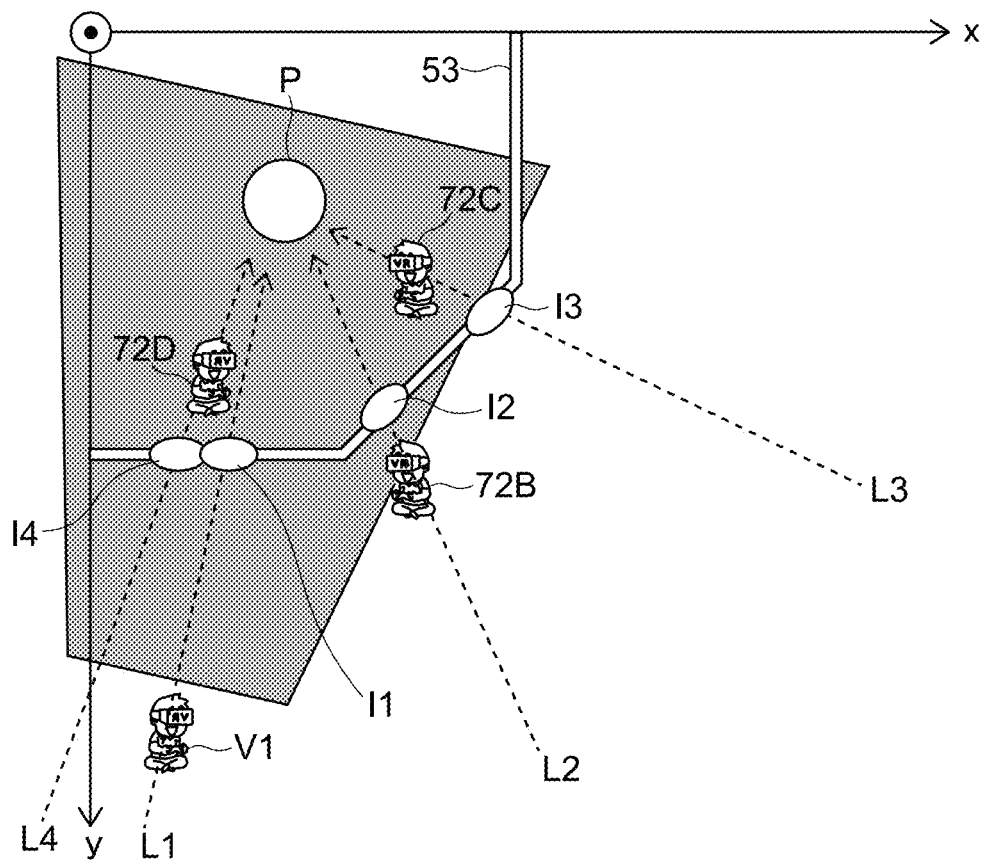
FIG. 19 A diagram showing a state in which to the content that a certain viewer is viewing, information expressing viewing states of other viewers is added in the case of FIG. 18.

FIG. 18 shows a case where the performer P, a plurality of virtual viewers V, and the display 53 have a certain positional relationship. At this time, in a case where avatar content expressing the viewing state of the other viewer is added to the content viewed by a viewer V1 on the basis of the viewing position of the other viewer or the position of the avatar image 71 of the other viewer, there is a possibility that the added content (avatar content 72) appears in the vicinity of the intersection coordinates I in the viewing cone of the viewer 1 and obstructs the viewing of the distribution content of the viewer V1 as shown in FIG. 19.

Figure 20:
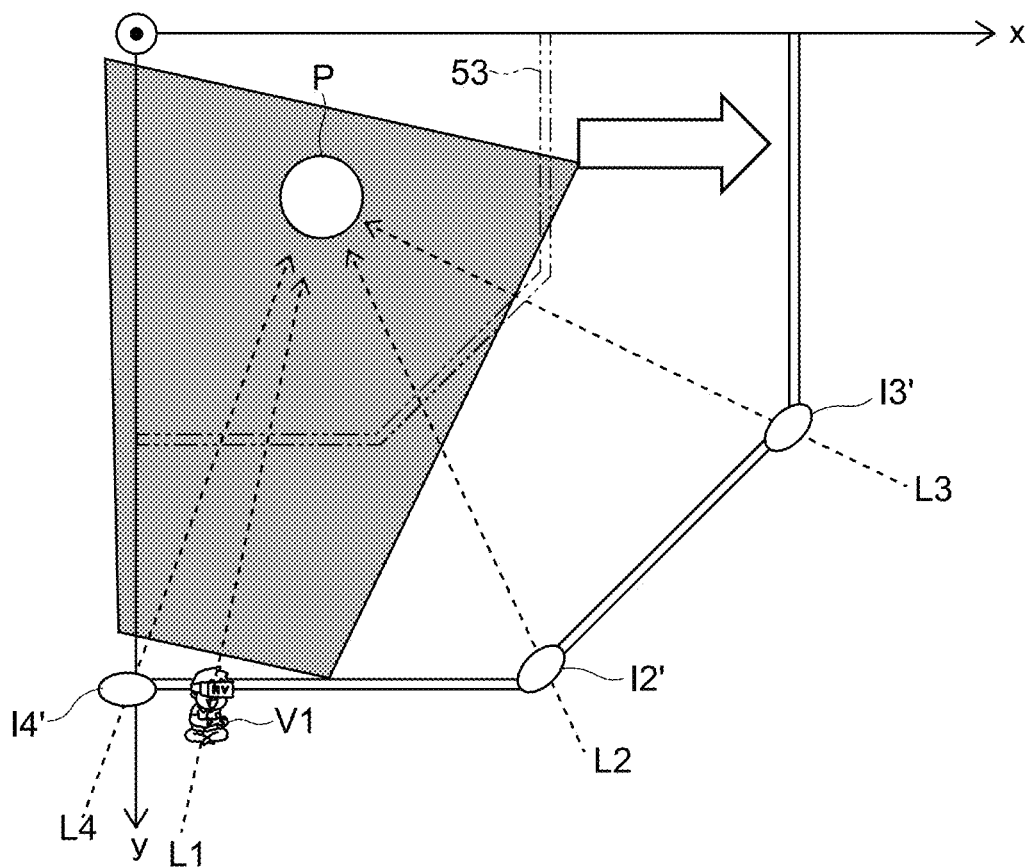
FIG. 20 A diagram showing a state in which to the content that a certain viewer is viewing, information expressing the viewing state of the viewer is added by moving and enlarging the display virtually in the case of FIG. 18.

To cope with this problem, the content generation server 400 can add the content expressing the viewing state of the other viewer to the distribution content without obstructing the viewing of the viewer V1 by virtually moving and enlarging the display 53 with reference to the position of the viewer V1 and using the intersection of the gaze of the other viewer and the virtual display 53 as the display position of the added content as shown in FIG. 20.

The position and size of the virtual display may be arbitrarily changed. For example, the content generation server 400 may be set such that the virtual display is always located behind the viewing position of the viewer V1 with respect to the content.

Alternatively, instead of the virtual display, the content generation server 400 may use an arbitrary plane, a spherical surface, or a combination thereof to determine the intersection with the gaze of the other viewer, and use the intersection as the display position of the added content.

In a case where the number of viewers is large, when the avatar images 71 of all the viewers are added to the content, the processing load of the content generation server 400 may increase or the quality of the entire content may lower due to the dense added content.

On the other hand, the viewer information management server 100 may share the viewing states only among members of a group or a community to which the respective viewers belong (e.g., acquired from an SNS or the like). Moreover, the content generation server 400 may also replace the viewer's avatar content 72 with an image easier to render (having lower resolution).

Adjusting Reproduction Position of Effect

When the effect added by the above-mentioned effect addition request is shared among the viewers, the effect addition position may be adjusted appropriately. Three specific cases are described herein, though not limited thereto.

(Case 1: Reproducing Effect in Viewing Cone of Each Viewer)

Even when a certain effect is reproduced by a request from a viewer, another viewer cannot notice it unless the effect is reproduced in the viewing cone.

Figure 21:
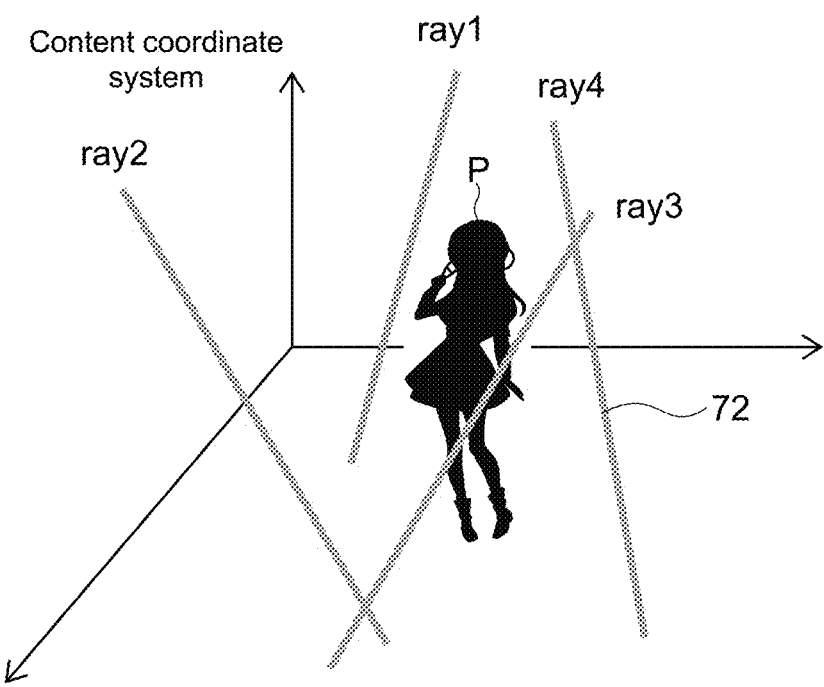
FIG. 21 A diagram showing an example in which reproduction of an effect of light beams according to a request from the viewer in the content distribution system.

For example, as shown in FIG. 21, an effect called "Random Rays" in which the effect of light rays is reproduced randomly in the content coordinate system will be assumed. When this effect is reproduced, the number of rays that each viewer can see varies depending on the position of the viewing cone of each viewer.

In contrast, the content generation server 400 adjusts the reproduction positions of the effect so that the effect is reproduced in the viewing cone of each viewer. As a result, the quality of the reproduced effect viewed by each viewer can be kept constant.

FIG. 22 shows how the effect reproduction positions of "Random Rays" requested by the other viewer is adjusted in accordance with the viewing cone VC of the viewer 1. The upper picture of the FIG. shows the position before the adjustment and the lower picture of the figure shows the position after the adjustment, and the reproduction positions of ray2 and ray4, which are located at positions outside the viewing cone VC in the upper picture, are adjusted so as to be visible in the viewing cone VC in the lower picture.

For the generation of the viewing cone VC that determines the effect reproduction positions in this manner, the viewing direction of the viewer may be used as the center or the head direction may be used as the center.

(Case 2: Adjusting Effect Generation Center in Accordance with Gaze Direction of Each Viewer and Position of Performer)

If an effect requested by a certain viewer is similarly added to content distributed to other viewers, it may obstruct the viewers viewing the distribution content from a viewpoint different from that of the requesting viewer.

For example, there is a case where an effect requested by a viewer is reproduced in a space between another viewer and the performer. One way to avoid this problem is to stop the reproduction of a target effect in the viewer output system 200 of the viewer if an effect with or without a particular attribute is to be reproduced in the space between the viewer and the performer. However, in a case where the way is used, a certain viewer may not be able to see the effect requested by the other viewer having a different viewpoint.

To cope with this problem, each viewer output system 200 may adjust the generation center of the reproduced effect in accordance with the gaze direction of each viewer and the position of the performer.

Here, setting an effect generation center in a performer coordinate system defined using the position of the performer as the basis is considered. The effect generation center is reference coordinates that determine the reproduction positions of an effect with or without a specific attribute.

Figure 23:
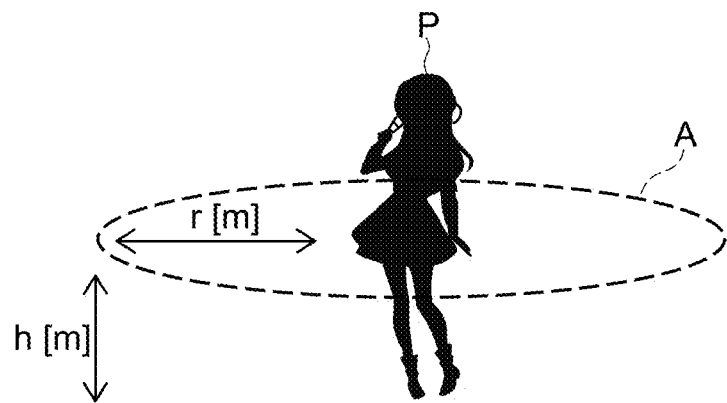
FIG. 23 A diagram showing a region in which the effect generation center set by using the performer as the center can be set in the content distribution system.

FIG. 23 shows a region A in which an effect generation center set using the performer P as the center can be set. Here, as an example, a circle having a radius r [m] horizontal to the ground is set at a height h [m] and the center thereof is set at the performer P, though the setting method of the region A is not limited.

Figure 24:
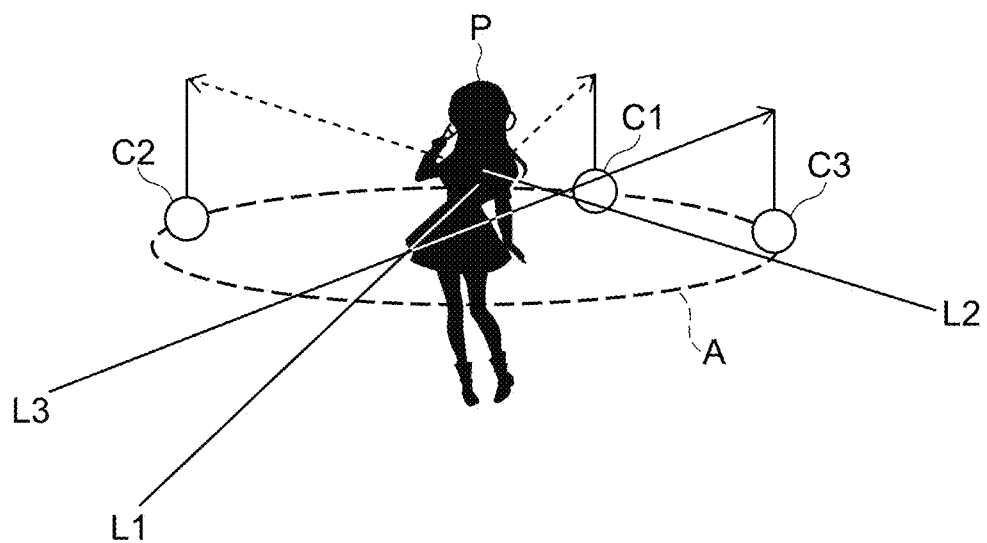
FIG. 24 A diagram showing a state in which the effect generation center is set for each viewer by using the region set in the example of FIG. 23.

FIG. 24 shows a state in which an effect generation center C is set for each viewer by using the set region A. As the gaze L of each viewer is mapped to a plane in which the effect generation center settable region A is present, the effect generation center C is set to be an intersection of the intersections of the mapped gaze and the effect generation center settable region A, which is furthest from the viewer.

As can be seen from the figure, different effect generation centers C1 to C3 are set for the viewers, respectively. When the viewer 2 (associated with the gaze L2) issues an effect reproduction request from the state shown in the figure, for example, a viewer output system 200A of the viewer 1 (associated with the gaze L1) reproduces the effect at the position of the effect generation center C1 of the viewer 1 and an output system 200C of the viewer 3 reproduces the effect at the position of the effect generation center C3 of the viewer 3.

This allows any viewer to view effects requested by other viewers without obstructing the viewing of the distribution content.

The processing of setting the region A and the effect generation center C may be performed not by each viewer output system 200 but by the content generation server 400 receiving the gaze parameter of each viewer from each viewer output system 200 through the viewer information management server 100 or directly.

(Case 3: Adjusting Effect Reproduction Position in Accordance with Viewer's Gaze Direction and Effect Attribute)

Adjusting the reproduction positions by using the viewer's gaze direction and background content attributes with respect to an effect with a specific attribute can appropriately reproduce the effect to each viewer.

Figure 25:
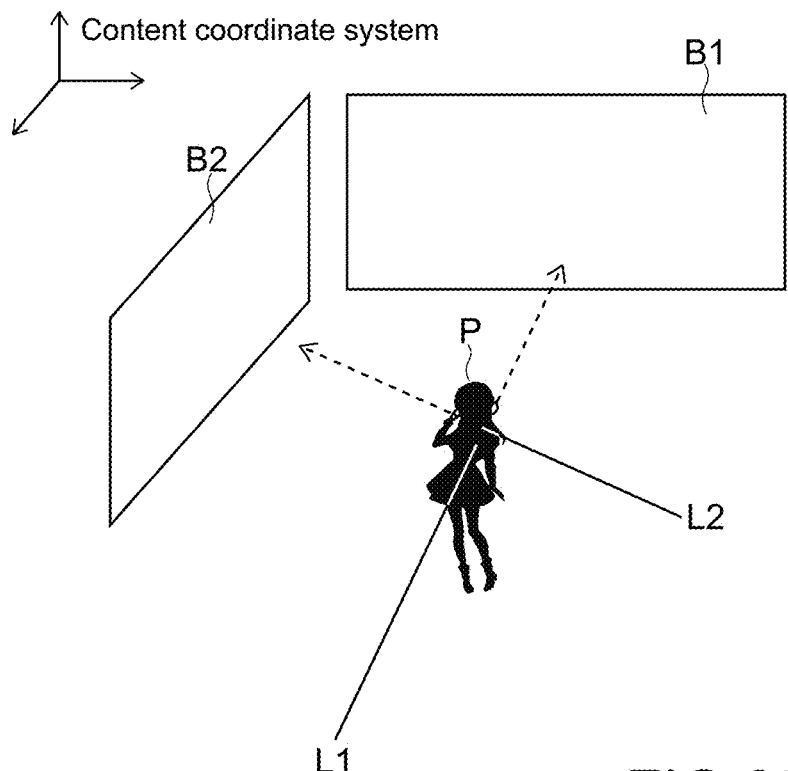
FIG. 25 A diagram showing an example in which background content having different plane parameters are arranged for each of the viewers having different gazes in the content distribution system.

As an example, it is defined that the effect to be reproduced has a text attribute and the effect with the text attribute is reproduced on a plane of background content having a spread equal to or larger than a certain area. In FIG. 25, background content Plane1 and background content Plane2 having different plane parameters are arranged at the ends of the gaze L1 and the gaze L2 of the viewer 1 and the viewer 2, respectively.

Figure 26:
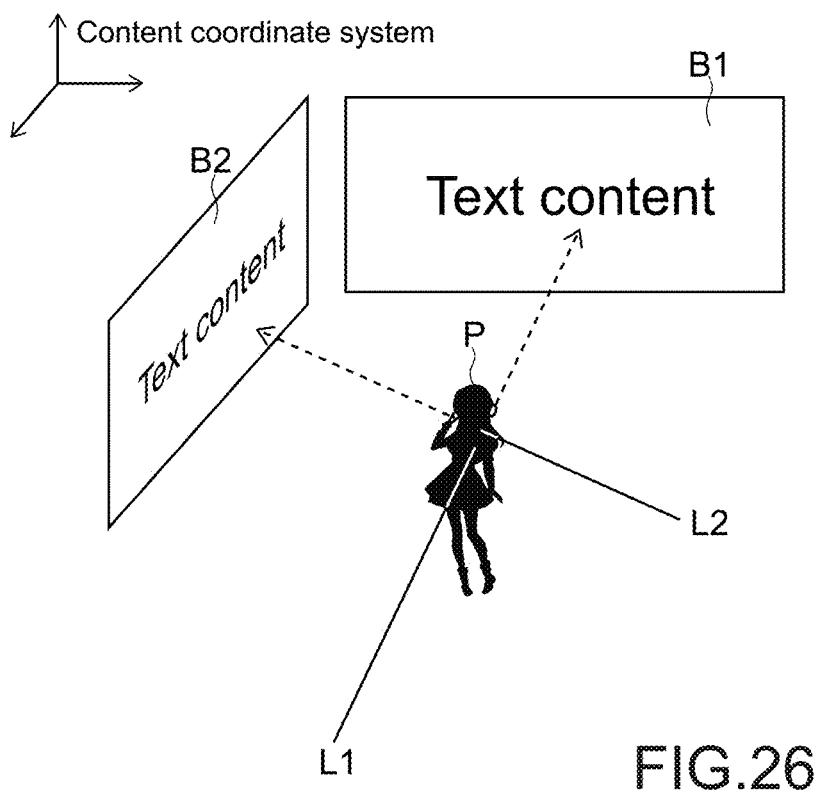
FIG. 26 A diagram showing a reproduction example of an effect in the case of FIG. 25.

At this time, in a case where a reproduction request for the effect with the text attribute is issued, the viewer output system 200A of the viewer 1 reproduces the effect on Plane1 and a viewer output system 200B of the viewer 2 reproduces the effect on Plane2 as shown in FIG. 26.

Accordingly, the effect with the text attribute can be reproduced in a manner suitable for each viewer. It should be noted that in a case where an appropriate plane is not present at a position to which the viewer's gaze is directed, a virtual plane may be generated behind the performer as viewed from the viewer and the effect may be reproduced on the plane, for example.

The display processing of the respective background content may be performed not by each viewer output system 200 but by the content generation server 400 receiving the gaze parameter of each viewer from each viewer output system 200 through the viewer information management server 100 or directly.

Processing of Adding Effects to Distribution Content and Processing Position

When many effect reproduction requests are issued, there are problems such as distribution delays caused by an increase in processing amount to add effects to the distribution content and an increase in communication data. To avoid this problem, it is possible to perform filtering of the reproduction request by using the viewer's gaze information.

For example, the content generation server 400 may reflect, on content to be distributed to a certain viewer, only an effect reproduction request of another viewer having a viewing parameter close to the certain viewer.

It is also possible to adjust the magnitude of the effect in accordance with the number of simultaneous viewers. For example, in a case of the "Random Rays" effect described in FIGS. 21 and 22, when the number of simultaneous viewers is X or more, the content generation server 400 may set the number of light rays to be reproduced for one reproduction request to n, and when the number of simultaneous viewers is equal to or larger than Y larger than X described above, the content generation server 400 may set it to y larger than x described above.

Moreover, the content generation server 400 does not add the effect, the reproduction position of which is determined in accordance with the viewer's gaze information, to the content distributed from the content distribution server 500, but sends information regarding the effect to the output system 200 of each viewer to cause it to add the effect, such that the load on the content generation server 400 and the content distribution server 500 can be reduced.

Using Different Reproduction Methods in Accordance with Attributes of Effect

In addition to the above, the following attributes can be used to change the reproduction method in accordance with the attributes of the effect.

For example, an effect having an attribute that changes or does not change the display posture in accordance with the viewer's gaze direction, an effect having an attribute that changes or does not change the display posture in accordance with the direction of the performer, an effect having an attribute that is not displayed in the viewing cone between the viewer and the performer, an effect having an attribute that performs reproduction using the distance between the viewer and the performer as a parameter, an effect having an attribute that performs reproduction using the degree of eye contact between the performer and the viewer's gaze as a parameter, and the like are conceivable.

As described above, in accordance with this embodiment, the content distribution system can cause the performer to notice the virtual gaze of the viewer in the same space as the performer, and can cause the performer to give an appropriate performance in accordance with the viewer's reaction even for a remote viewer.

Moreover, in accordance with the above, the performer and the viewer can communicate with each other as if they are physically close to each other even though they are remote from each other.

Moreover, since each viewer can set an effect reproduction request in accordance with their own input device, the same request can be sent from any device.

(Differences Caused by the Possessed Devices are Overcome.)

Moreover, since the viewer's action is mapped to the effect ID and sent to the viewer information management server 100, the amount of communication data for expressing the viewer's action is drastically reduced.

Moreover, since the content distributor generates effects that can be requested, malicious actions, which occur, for example, in communication where any text is available, can be eliminated.

Moreover, the content distribution system allows viewers viewing common content to share the experience by reflecting the viewer's actions on the distribution content.

Moreover, the content distribution system can differentiate the services provided for each viewer by controlling the effects that can be reproduced and requested to be added for each viewer.

[Modified Examples]

The present invention is not limited only to the above-mentioned embodiments and various modifications can be made without departing from the gist of the present invention.

In the above-mentioned embodiment, in a case where it is determined that a specific communication has been established between the performer and the viewer, the viewer information providing server 100 or the content generation server 300 may enhance the communication experience by adding a special effect to the distribution content of all the viewers. The establishment of the specific communication includes, for example, a case where the performer and the viewer have looked at each other, a case where a specific effect reproduction request has been received for a specific performance of the performer, and the like.

For determining whether or not the performer and the viewer have looked at each other, it is sufficient that the viewer information management server 100 or the content generation server 300 determines, for example, whether or not the gaze of the performer is directed toward the avatar image 71 of a certain viewer on the display and whether or not an absolute value of an inner product of gaze vectors of the performer and the viewer is less than such a predetermined threshold value that both gaze vectors become substantially parallel.

Moreover, the viewer information management server 100 may output a special visual effect or sound effect from the vicinity of the avatar image (intersection coordinates) associated with the viewer on the display 53 when the performer and the viewer have looked at each other.

Moreover, the viewer information management server 100 counts the number of times that the performer and the viewer have looked at each other, so that a value indicating a frequency at which the performer and the viewer have looked at each other in each direction can be displayed as a histogram in association with each intersection coordinates I of the display 53. Based on this information, the performer can give a performance in a direction in which the frequency at which the performer and the viewer have looked at each other is low, to thereby increase the degree of satisfaction of all the viewers.

Figure 14:
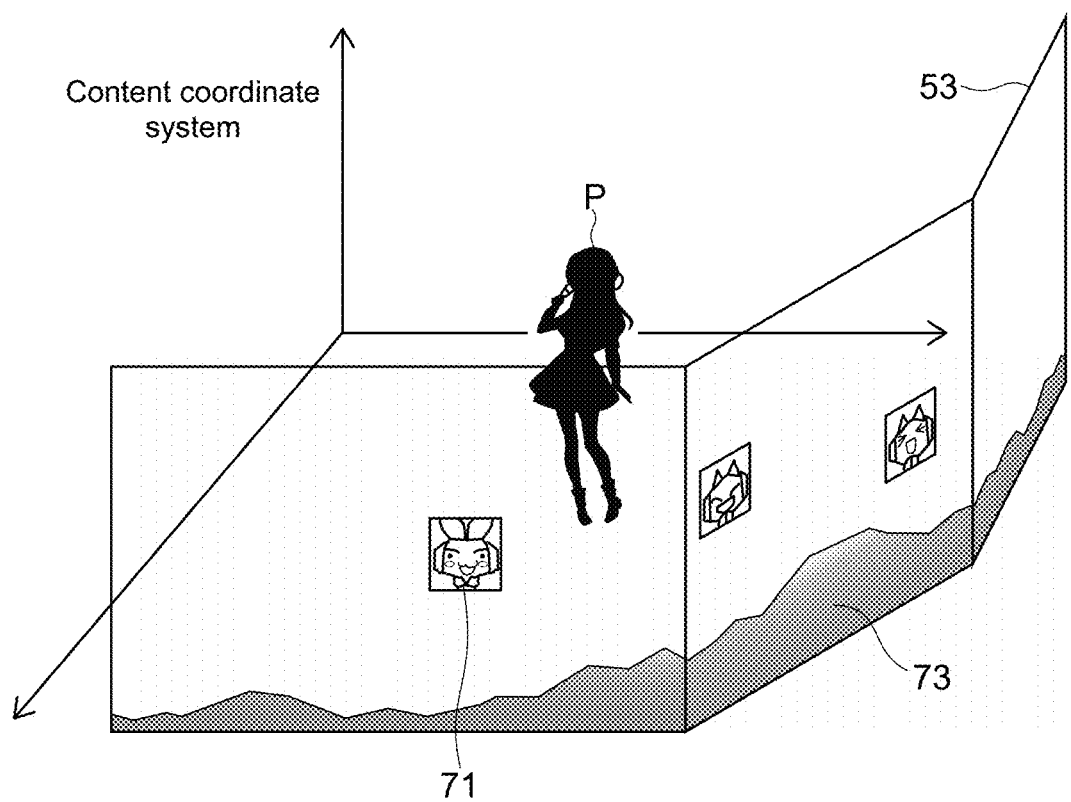
FIG. 14 A diagram showing a display example of a histogram showing the number of times that the performer and the viewer have looked at each other in the content distribution system.

FIG. 14 shows an example in which a frequency histogram 73 indicating such a frequency is displayed on the display 53. As the value of the frequency histogram 73, it is conceivable to use a value obtained by dividing the sum total of the number of times that the performer and the viewer present in each direction have looked at each other by the number of viewers present in the direction.

Moreover, since the performer and the viewer can communicate with each other in a manner close to the actual experience even though they are remote from each other, it is possible to add a value to a specific viewing position in the live streaming service.

For example, on the assumption that the performer frequently communicates toward a specific viewing position, the content distribution system can generate a high-value-added viewing position by, for example, restricting the number of viewers who can use the viewing position while imposing a higher viewing fee than usual on the viewer who uses the position.

In the above-mentioned embodiment, the content is shot by the cameras 51 fixed to the shooting studio, though the content may be shot by, for example, a drone while moving instead of the cameras 51.

[Supplement]

The present technology can also take the following configurations.

(1) An information processing system, including
   a control unit that
      acquires, from a terminal of a viewer on which content obtained by shooting a performance of a performer is being reproduced via a network in real time, a gaze parameter indicating a gaze of the viewer in a coordinate system of a space in which the viewer is present, the gaze parameter being acquired together with a viewer identification information for identifying the viewer,
   converts the acquired gaze parameter to a gaze parameter indicating a virtual gaze of the viewer in a coordinate system of a space in which the performer is present, and
   outputs, on the basis of the converted gaze parameter, gaze information indicating the virtual gaze of the viewer to an output device in the space in which the performer is present.

(2) The information processing system according to (1), in which
   the output device is a display, and
   the control unit calculates, on the basis of the converted gaze parameter, intersection coordinates of the display and the virtual gaze and causes an image associated with the viewer to be output as the gaze information at a position associated with the intersection coordinates of the display.

(3) The information processing system according to (2), in which
   in a case where intersection coordinates associated with a predetermined number of viewers or more are present in a predetermined region of the display, the control unit causes a single predetermined image showing a viewer group to be output instead of an image associated with each of the viewers.

(4) The information processing system according to (2) or (3), in which the control unit acquires attribute information
   indicating an attribute of the viewer together with the gaze parameter and changes an output mode of the image in accordance with the attribute information.

(5) The information processing system according to any one of (2) to (4), in which
   the control unit determines, on the basis of the converted gaze parameter, whether or not the viewer is looking at the performer, and changes an output mode of the image in accordance with a result of the determination.

(6) The information processing system according to any one of (2) to (5), in which
   in a case where first intersection coordinates calculated at a first time and associated with a first viewer having first viewer identification information and second intersection coordinates calculated at a second time later than the first time and associated with the first viewer are different from each other, the control unit causes the image associated with the viewer to be displayed while being moved at a trajectory linking the first intersection coordinates to the second intersection coordinates.

(7) The information processing system according to any one of (2) to (6), further including
   a storage unit that stores information indicating a plurality of kinds of effects capable of being reproduced together with the image, the information being stored in association with effect identification information for identifying the effect, in which
   in a case where the control unit has received, from the terminal of the viewer, an effect reproduction request including the viewer identification information and the effect identification information, the control unit causes an effect associated with the effect identification information to be output from a vicinity of the intersection coordinates associated with the viewer identification information.
(8) The information processing system according to (7), in which
in a case where effect reproduction requests associated with the predetermined number of viewers or more are present in a predetermined region of the display, the control unit causes a single predetermined effect to be output instead of effects associated with the respective viewers.
(9) The information processing system according to (7) or (8), in which
in a case where the control unit has received, from the predetermined number of viewers or more, effect reproduction requests having identical effect identification information, the control unit causes a single predetermined effect to be output instead of effects associated with the respective viewers.
(10) The information processing system according to any one of (7) to (9), in which
a plurality of loudspeakers is installed at different positions on the display, and
in a case where the effect associated with the effect identification information included in the effect reproduction request is a sound effect, the control unit causes the sound effect to be output from a loudspeaker provided in the vicinity of the intersection coordinates associated with the viewer identification information.
(11) The information processing system according to any one of (2) to (10), in which
in a case where the control unit has acquired a gaze parameter indicating a gaze of the performer and determined that an absolute value of an inner product of a gaze vector obtained from the gaze parameter of the performer and a gaze vector obtained from the gaze parameter indicating the virtual gaze of the viewer is smaller than a predetermined threshold, the control unit causes a predetermined effect to be output from a vicinity of the intersection coordinates associated with the viewer identification information.
(12) The information processing system according to any one of (2) to (10), in which
the control unit acquires a gaze parameter indicating a gaze of the performer, counts, for each of the plurality of viewers, the number of times that an absolute value of an inner product of a gaze vector obtained from the gaze parameter of the performer and a gaze vector obtained from a gaze parameter indicating the virtual gaze of each of the viewers is smaller than a predetermined threshold, and causes the display to display a histogram in which a value associated with the number of times of each of the viewers is associated with a vicinity of the intersection coordinates associated with each of the viewers.
(13) An information processing method, including:
acquiring, from a terminal of a viewer on which content obtained by shooting a performance of a performer is being reproduced via a network in real time, a gaze parameter indicating a gaze of the viewer in a coordinate system of a space in which the viewer is present, the gaze parameter being acquired together with a viewer identification information for identifying the viewer;
converting the acquired gaze parameter to a gaze parameter indicating a virtual gaze of the viewer in a coordinate system of a space in which the performer is present; and
outputting, on the basis of the converted gaze parameter, gaze information indicating the virtual gaze of the viewer to an output device in the space in which the performer is present.
(14) A program that causes an information processing apparatus to execute the steps of:
acquiring, from a terminal of a viewer on which content obtained by shooting a performance of a performer is being reproduced via a network in real time, a gaze parameter indicating a gaze of the viewer in a coordinate system of a space in which the viewer is present, the gaze parameter being acquired together with a viewer identification information for identifying the viewer;
converting the acquired gaze parameter to a gaze parameter indicating a virtual gaze of the viewer in a coordinate system of a space in which the performer is present; and
outputting, on the basis of the converted gaze parameter, gaze information indicating the virtual gaze of the viewer to an output device in the space in which the performer is present.

REFERENCE SIGNS LIST

11 CPU
18 input device
19 output device
20 storage device
26 imaging device
23 communication device
51 camera
52 microphone
53 display
71 avatar image
72 effect
73 histogram
100 viewer information management server
200 performer output system
300 viewer output system
400 content generation server
500 content distribution server
P performer
V viewer
L gaze
VL virtual gaze

The invention claimed is:
1. An information processing system, comprising:
a control unit configured to
acquire, from a terminal of a viewer on which content obtained by shooting a performance of a performer is being reproduced via a network in real time, a gaze parameter indicating a gaze of the viewer in a coordinate system of a space in which the viewer is present, the gaze parameter being acquired together with a viewer identification information for identifying the viewer,
convert the acquired gaze parameter to a converted gaze parameter indicating a virtual gaze of the viewer in a coordinate system of a space in which the performer is present,
calculate, based on the converted gaze parameter, intersection coordinates related to the virtual gaze, and output, based on the converted gaze parameter, gaze information indicating the intersection coordinates related to the virtual gaze of the viewer to an output device in the space in which the performer is present, wherein the control unit is implemented via at least one processor.

2. The information processing system according to claim 1, wherein the output device includes a display,
wherein the control unit calculates, based on the converted gaze parameter, the intersection coordinates of the display and the virtual gaze, and
wherein the control unit is further configured to cause an image associated with the viewer to be output as the gaze information at a position associated with the intersection coordinates.

3. The information processing system according to claim 2, wherein in a case where intersection coordinates associated with at least a predetermined number of viewers are present in a predetermined region of the display, the control unit causes a single predetermined image showing a viewer group to be output instead of an image associated with each of the viewers.

4. The information processing system according to claim 2, wherein the control unit is further configured to
acquire attribute information indicating an attribute of the viewer together with the gaze parameter, and
change an output mode of the image in accordance with the attribute information.

5. The information processing system according to claim 2, wherein the control unit is further configured to
determine, based on the converted gaze parameter, whether or not the viewer is looking at the performer, and
change an output mode of the image in accordance with a result of the determination.

6. The information processing system according to claim 2, wherein in a case where first intersection coordinates calculated at a first time and associated with a first viewer having first viewer identification information and second intersection coordinates calculated at a second time later than the first time and associated with the first viewer are different from each other, the control unit is further configured to cause the image associated with the viewer to be displayed while being moved at a trajectory linking the first intersection coordinates to the second intersection coordinates.

7. The information processing system according to claim 2, further comprising:

a storage unit configured to store information indicating a plurality of kinds of effects capable of being reproduced together with the image, the information being stored in association with effect identification information for identifying the effect,
wherein in a case where the control unit has received, from the terminal of the viewer, an effect reproduction request including the viewer identification information and the effect identification information, the control unit is further configured to cause an effect associated with the effect identification information to be output from a vicinity of the intersection coordinates associated with the viewer identification information, and wherein the storage unit is implemented via a non-transitory computer-readable storage medium.

8. The information processing system according to claim 7, wherein in a case where effect reproduction requests associated with at least a predetermined number of viewers are present in a predetermined region of the display, the control unit is further configured to cause a single predetermined effect to be output instead of effects associated with the respective viewers.

9. The information processing system according to claim 7, wherein in a case where the control unit has received, from at least a predetermined number of viewers, effect reproduction requests having identical effect identification information, the control unit is further configured to cause a single predetermined effect to be output instead of effects associated with the respective viewers.

10. The information processing system according to claim 7, wherein a plurality of loudspeakers are installed at different positions on the display, and
wherein in a case where the effect associated with the effect identification information included in the effect reproduction request is a sound effect, the control unit is further configured to cause the sound effect to be output from a loudspeaker provided in the vicinity of the intersection coordinates associated with the viewer identification information.

11. The information processing system according to claim 2, wherein in a case where the control unit has acquired a performer gaze parameter indicating a gaze of the performer and determined that an absolute value of an inner product of a gaze vector obtained from the performer gaze parameter of the performer and a gaze vector obtained from the converted gaze parameter indicating the virtual gaze of the viewer is smaller than a predetermined threshold, the control unit is further configured to cause a predetermined effect to be output from a vicinity of the intersection coordinates associated with the viewer identification information.

12. The information processing system according to claim 2, wherein the control unit is further configured to
acquire a performer gaze parameter indicating a gaze of the performer,
count, for each of the plurality of viewers, a number of times that an absolute value of an inner product of a gaze vector obtained from the performer gaze parameter of the performer and a gaze vector obtained from the converted gaze parameter indicating the virtual gaze of each of the viewers is smaller than a predetermined threshold, and
cause the display to display a histogram in which a value associated with the number of times of each of the viewers is associated with a vicinity of the intersection coordinates associated with each of the viewers.

13. An information processing method, comprising:

acquiring, from a terminal of a viewer on which content obtained by shooting a performance of a performer is being reproduced via a network in real time, a gaze parameter indicating a gaze of the viewer in a coordinate system of a space in which the viewer is present, the gaze parameter being acquired together with a viewer identification information for identifying the viewer;

converting the acquired gaze parameter to a converted gaze parameter indicating a virtual gaze of the viewer in a coordinate system of a space in which the performer is present;

calculating, based on the converted gaze parameter, intersection coordinates related to the virtual gaze; and outputting, based on the converted gaze parameter, gaze information indicating the intersection coordinates related to the virtual gaze of the viewer to an output device in the space in which the performer is present.

14. A non-transitory computer-readable storage medium having embodied thereon a program, which when executed by a computer causes the computer to execute a method, the method comprising:

acquiring, from a terminal of a viewer on which content obtained by shooting a performance of a performer is being reproduced via a network in real time, a gaze parameter indicating a gaze of the viewer in a coordinate system of a space in which the viewer is present, the gaze parameter being acquired together with a viewer identification information for identifying the viewer;

converting the acquired gaze parameter to a converted gaze parameter indicating a virtual gaze of the viewer in a coordinate system of a space in which the performer is present;

calculating, based on the converted gaze parameter, intersection coordinates related to the virtual gaze; and outputting, based on the converted gaze parameter, gaze information indicating the intersection coordinates related to the virtual gaze of the viewer to an output device in the space in which the performer is present.

* * * * *